US010664667B2

(12) United States Patent
Tsujikawa et al.

(10) Patent No.: US 10,664,667 B2
(45) Date of Patent: May 26, 2020

(54) INFORMATION PROCESSING METHOD, INFORMATION PROCESSING DEVICE, AND RECORDING MEDIUM HAVING PROGRAM RECORDED THEREON

(71) Applicant: Panasonic Intellectual Property Corporation of America, Torrance, CA (US)

(72) Inventors: Misaki Tsujikawa, Osaka (JP); Tsuyoki Nishikawa, Osaka (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 162 days.

(21) Appl. No.: 16/058,271

(22) Filed: Aug. 8, 2018

(65) Prior Publication Data

US 2019/0065478 A1 Feb. 28, 2019

(30) Foreign Application Priority Data

Aug. 25, 2017 (JP) ................. 2017-162841

(51) Int. Cl.
*G10L 15/00* (2013.01)
*G06F 40/58* (2020.01)
(Continued)

(52) U.S. Cl.
CPC .............. *G06F 40/58* (2020.01); *G06F 3/167* (2013.01); *G10L 15/32* (2013.01); *G10L 17/005* (2013.01);
(Continued)

(58) Field of Classification Search
CPC ....................................................... G10L 15/00
(Continued)

(56) References Cited

U.S. PATENT DOCUMENTS 7,593,842 B2 * 9/2009 Rousseau ................ G06F 40/40
704/2
7,970,598 B1 * 6/2011 Flanagan ................ G06F 40/58
704/2

(Continued)

FOREIGN PATENT DOCUMENTS

| JP | 2014-048514 | 3/2014 |
| JP | 2016-080916 | 5/2016 |

*Primary Examiner* — Michael Colucci
(74) *Attorney, Agent, or Firm* — Greenblum & Bernstein, P.L.C.

(57) ABSTRACT

This information processing method includes: acquiring a first speech signal including a first utterance; acquiring a second speech signal including a second utterance; recognizing whether the speaker of the second utterance is a first speaker by comparing a feature value for the second utterance and a first speaker model; when the first speaker is recognized, performing speech recognition in a first language on the second utterance, generating text in the first language corresponding to the second utterance subjected to speech recognition in the first language, and translating the text in the first language into a second language; and, in a case where the first speaker is not recognized, performing speech recognition in the second language on the second utterance, generating text in the second language corresponding to the second utterance subjected to speech recognition in the second language, and translating the text in the second language into the first language.

14 Claims, 30 Drawing Sheets

(51) Int. Cl.
  *G06F 3/16* (2006.01)
  *G10L 17/00* (2013.01)
  *G10L 15/32* (2013.01)
  *G10L 13/04* (2013.01)
  *G10L 13/00* (2006.01)

(52) U.S. Cl.
  CPC ............ *G10L 13/00* (2013.01); *G10L 13/043* (2013.01); *G10L 17/00* (2013.01)

(58) Field of Classification Search
  USPC .. 704/2, 8, 4, 277, 236, 205, 235, 246, 249; 370/352
  See application file for complete search history.

(56) References Cited

U.S. PATENT DOCUMENTS

| | | | | |
|---|---|---|---|---|
| 8,442,812 B2* | 5/2013 | Ehsani | ................... | G10L 15/22 704/9 |
| 2002/0133339 A1* | 9/2002 | Gudorf | ................ | G06F 16/345 704/235 |
| 2004/0230420 A1* | 11/2004 | Kadannbe Shubha | ...................... | G10L 15/07 704/205 |
| 2006/0149558 A1* | 7/2006 | Kahn | ................... | G10L 15/063 704/278 |
| 2007/0016401 A1* | 1/2007 | Ehsani | ................... | G06F 40/55 704/9 |
| 2007/0150278 A1* | 6/2007 | Bates | ................... | G10L 15/197 704/257 |
| 2007/0255570 A1* | 11/2007 | Annaz | ................... | G09B 19/06 704/270 |
| 2009/0063150 A1* | 3/2009 | Nasukawa | .............. | G10L 15/26 704/253 |
| 2009/0306957 A1* | 12/2009 | Gao | ....................... | G06F 40/58 704/2 |
| 2011/0134910 A1* | 6/2011 | Chao-Suren | ...... | H04M 3/42391 370/352 |
| 2012/0330645 A1* | 12/2012 | Belisle | ................... | G06F 40/58 704/3 |
| 2013/0030789 A1* | 1/2013 | Dalce | ..................... | G10L 13/02 704/2 |
| 2013/0144595 A1* | 6/2013 | Lord | ....................... | G06F 40/58 704/2 |
| 2013/0144597 A1* | 6/2013 | Waibel | ................... | G10L 15/04 704/2 |
| 2013/0144603 A1* | 6/2013 | Lord | ....................... | G06F 3/165 704/9 |
| 2013/0144619 A1* | 6/2013 | Lord | ....................... | G06F 3/165 704/235 |
| 2013/0289971 A1* | 10/2013 | Parkinson | ............... | G10L 15/26 704/2 |
| 2015/0134322 A1* | 5/2015 | Cuthbert | ................. | G06F 40/58 704/3 |
| 2015/0154957 A1* | 6/2015 | Nakadai | ................. | G10L 15/26 704/235 |
| 2015/0199340 A1* | 7/2015 | Kwon | ..................... | G06F 40/58 704/2 |
| 2015/0228280 A1* | 8/2015 | Watanabe | .............. | G06F 40/55 704/235 |
| 2016/0111112 A1 | 4/2016 | Hayakawa | | |
| 2017/0235724 A1* | 8/2017 | Grewal | ................... | G06F 40/56 704/9 |

\* cited by examiner

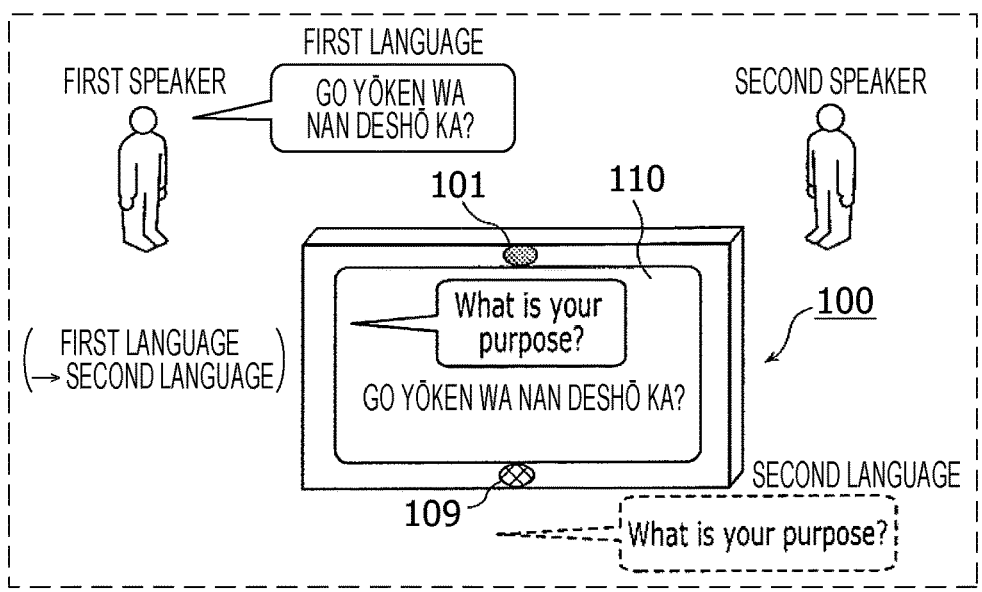
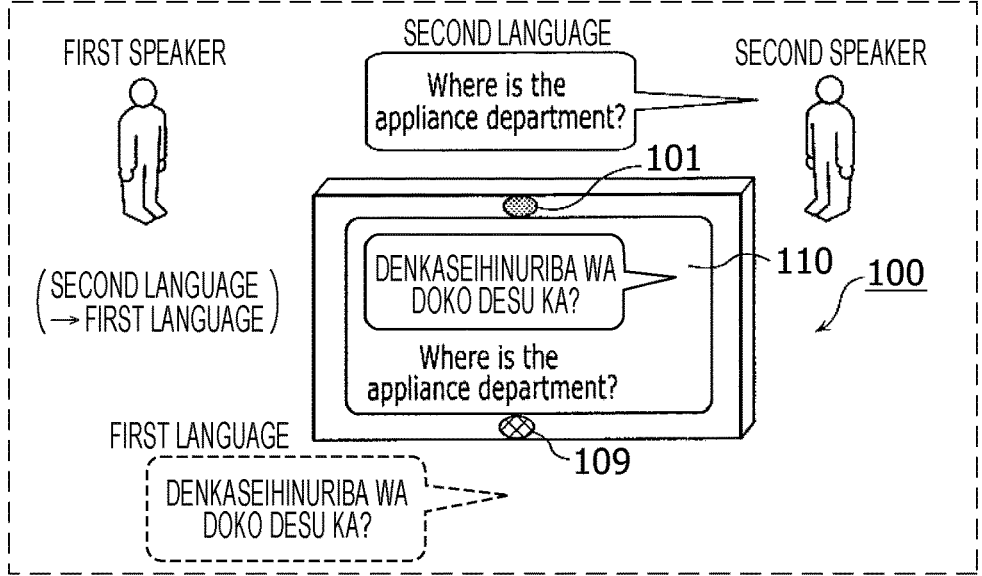
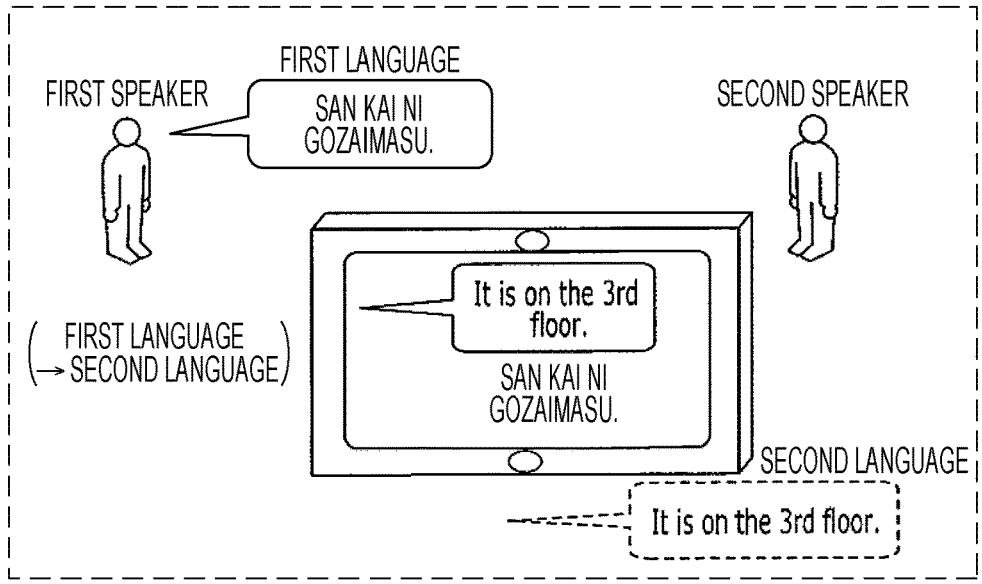

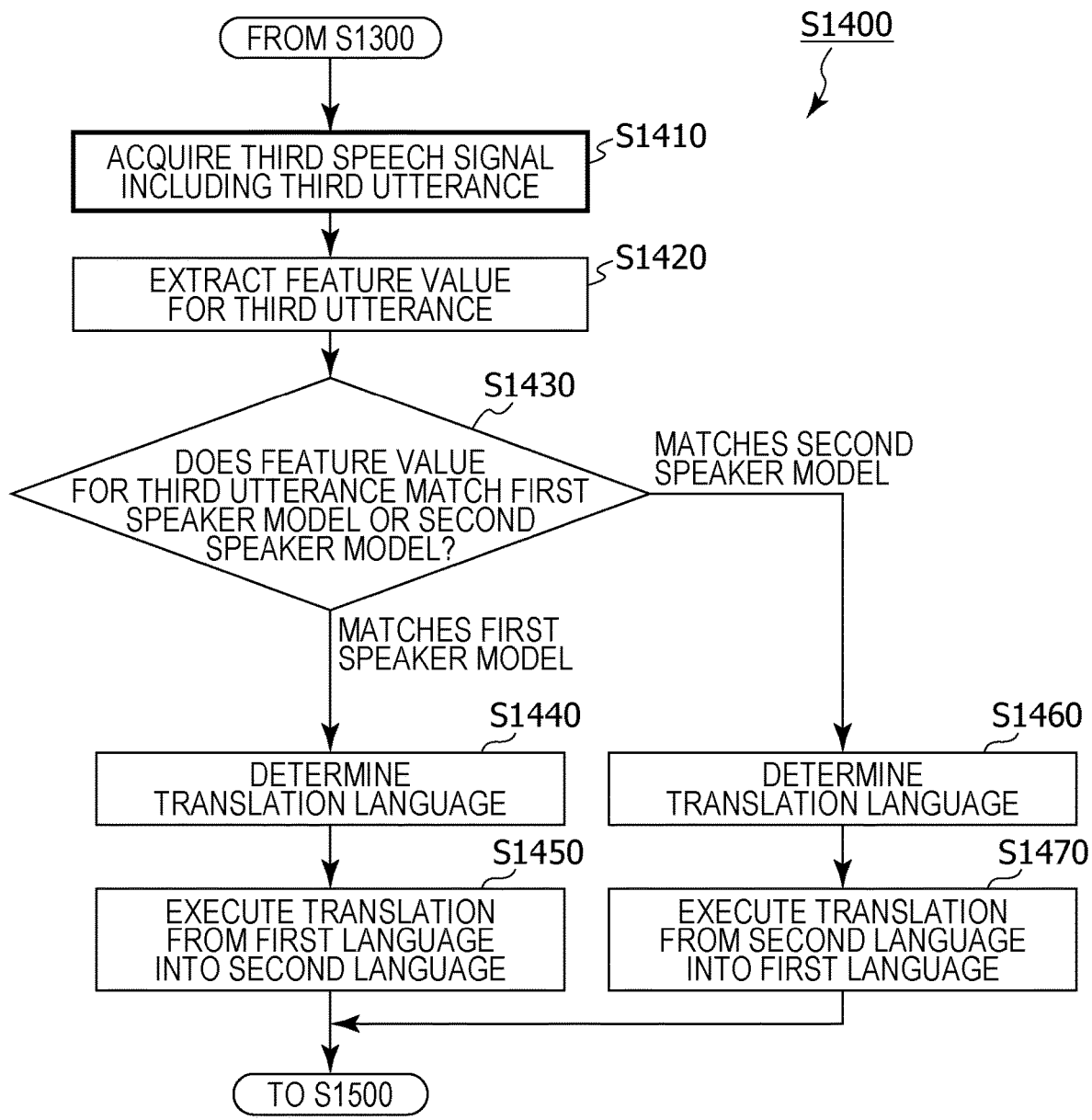

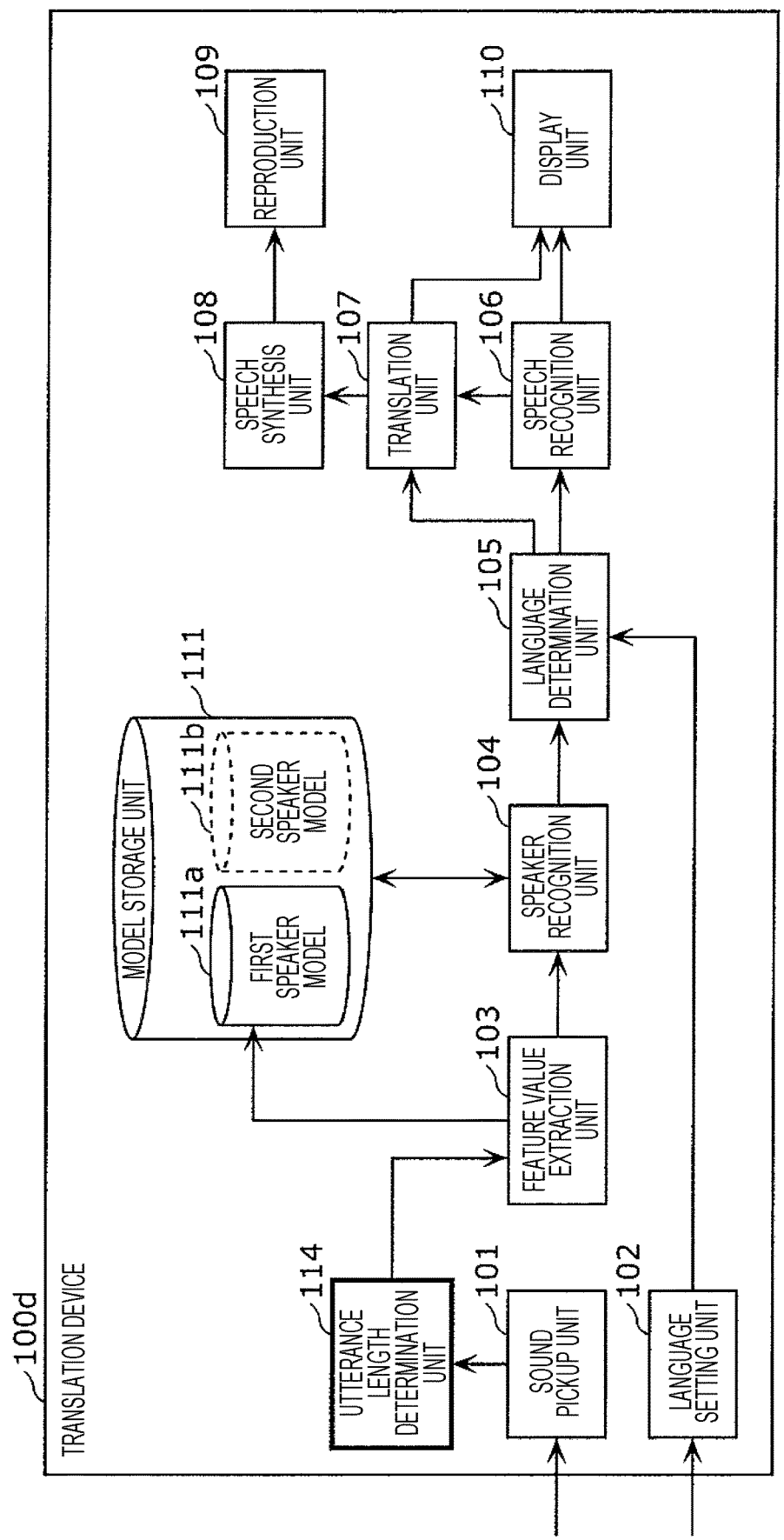

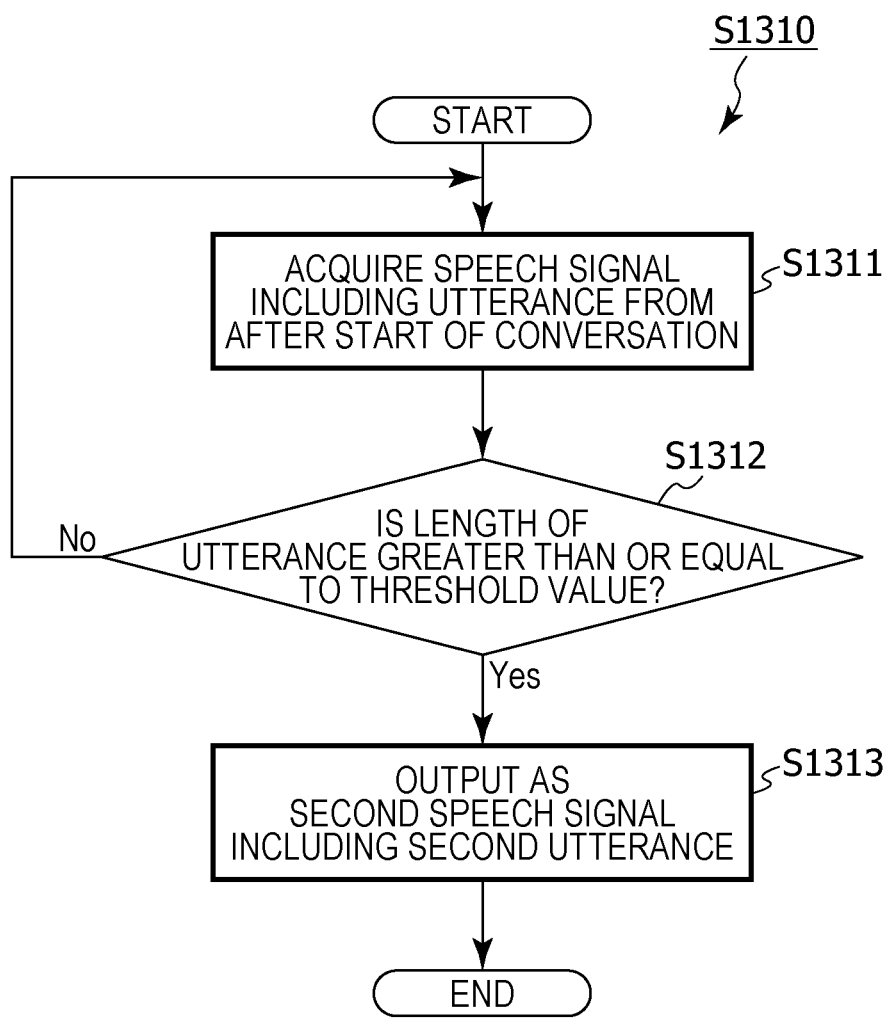

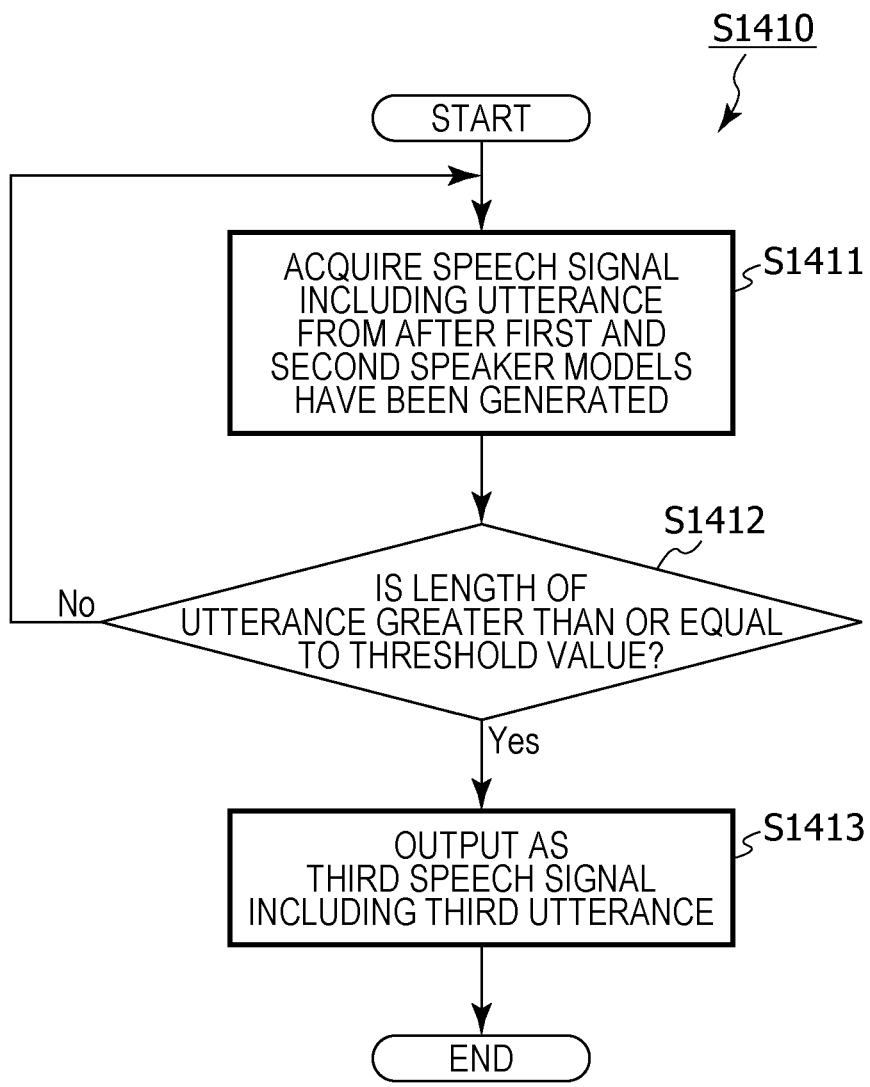

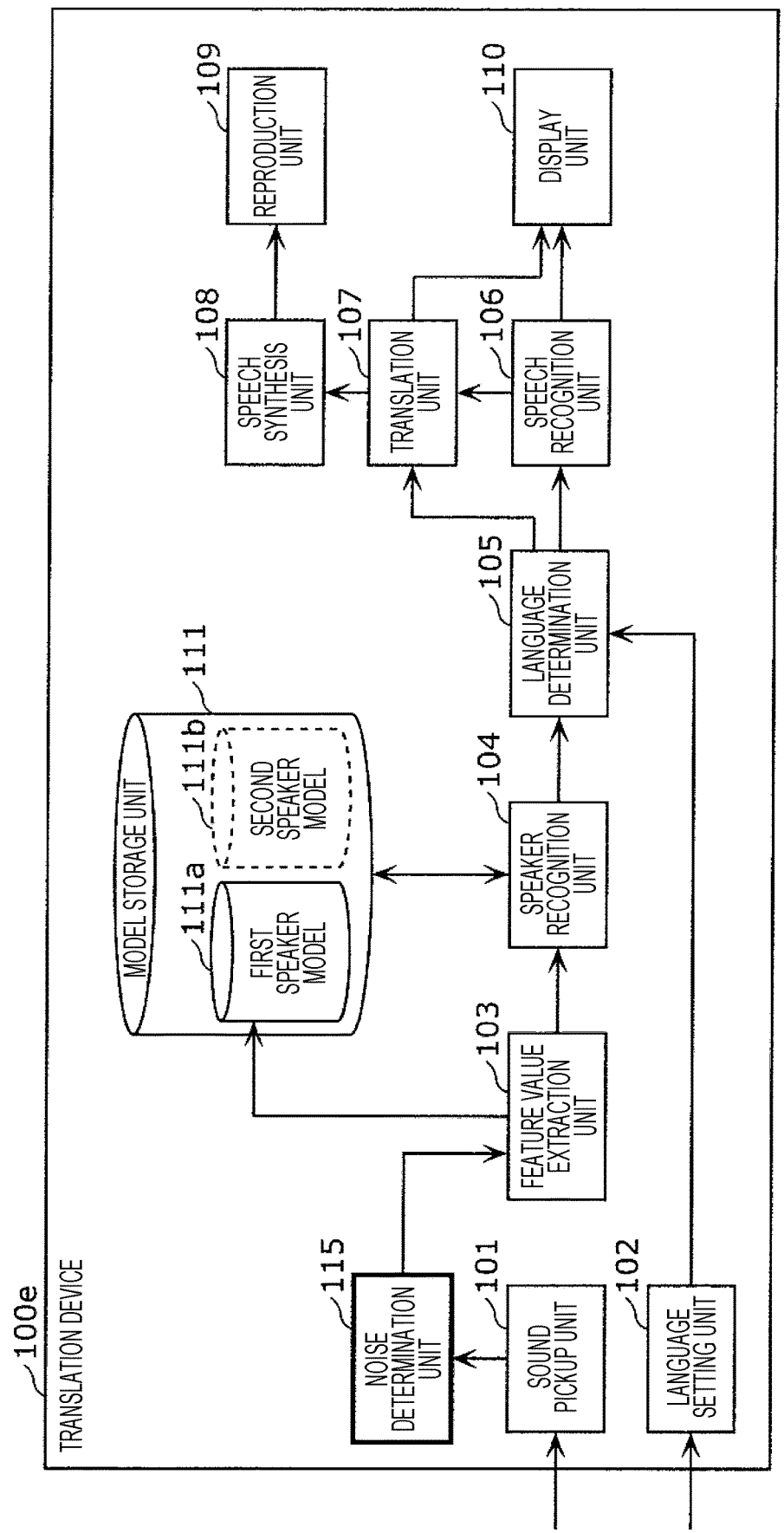

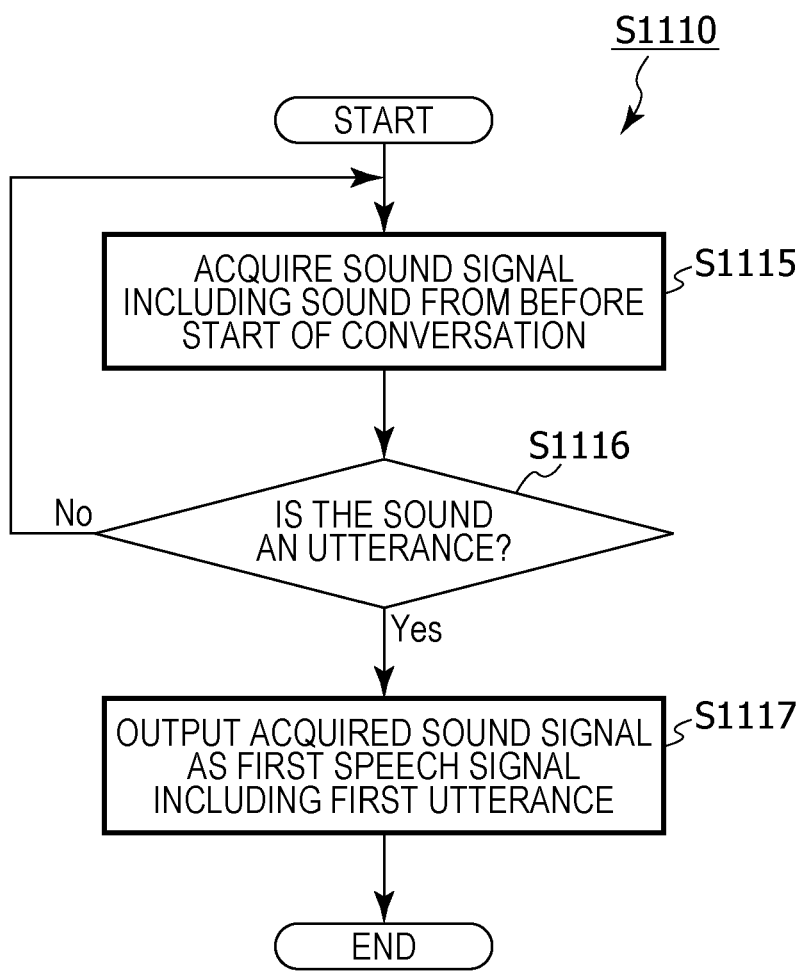

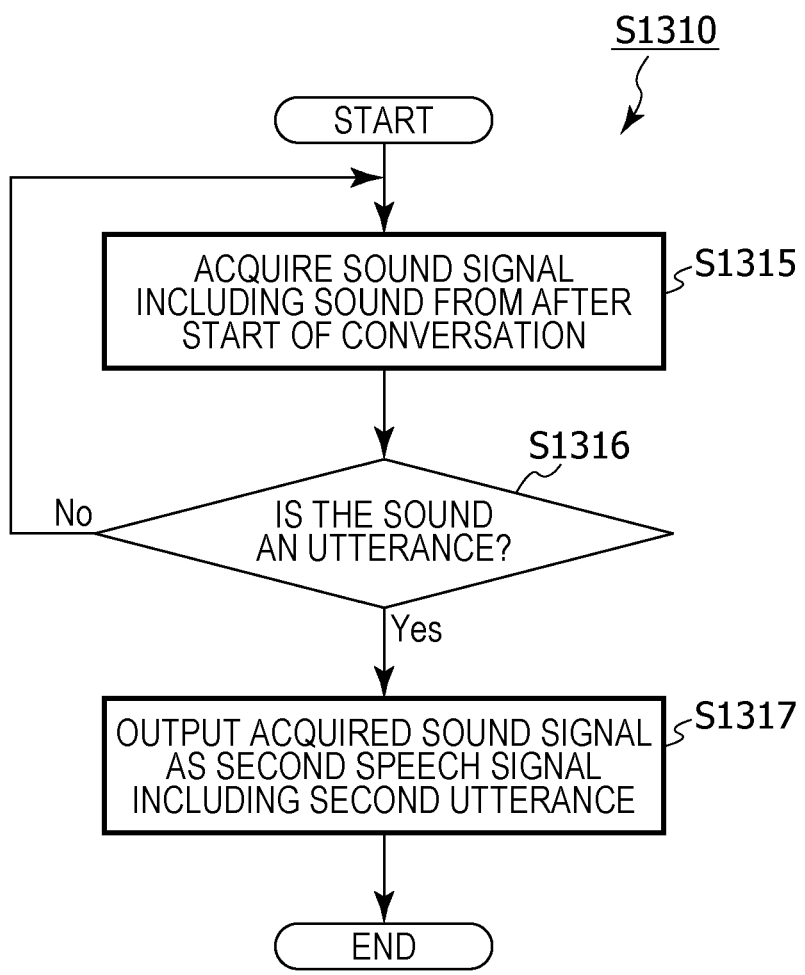

INFORMATION PROCESSING METHOD, INFORMATION PROCESSING DEVICE, AND RECORDING MEDIUM HAVING PROGRAM RECORDED THEREON

BACKGROUND

1. Technical Field

The present disclosure relates to an information processing method, an information processing device, and a recording medium having a program recorded thereon, with which a conversation that takes place in mutually different languages is translated.

2. Description of the Related Art

Translation devices that translate a conversation between a first speaker and a second speaker have been provided in the past. The first speaker and the second speaker converse in mutually different languages. For example, the first speaker speaks in Japanese, which is a first language, and the second speaker speaks in English, which is a second language.

In such a case, a conventional translation device determines a translation language for each utterance by means of a user button operation or the like. For example, when the user who is the first speaker speaks, he or she selects translation from the first language into the second language by operating a button of the translation device. Furthermore, when the second speaker speaks, the user selects translation from the second language into the first language by operating a button of the translation device.

Consequently, there is a problem in that it is necessary for the translation device to be operated every time each of the first speaker and the second speaker speaks, and it is therefore not possible for a conversation that involves translation to be carried out smoothly.

Furthermore, Japanese Unexamined Patent Application Publication No. 2016-080916 discloses a speaker change detection device that detects, in a conversation between a plurality of speakers, that the group of speakers engaged in a dialogue has changed. Additionally, Japanese Unexamined Patent Application Publication No. 2014-048514 provides a speech recognition device that performs highly accurate speech recognition by estimating the arrival direction of input speech.

SUMMARY

In one general aspect, the techniques disclosed here feature an information processing method that includes: setting, in a memory, language setting information that includes first language information having associated therein a first speaker and a first language spoken by the first speaker, and second language information having associated therein a second speaker and a second language that is a language spoken by the second speaker and is different from the first language; acquiring a first speech signal that includes a first utterance of the first speaker, using a microphone; generating a first speaker model that is a model of a feature value for an utterance of the first speaker, from the first utterance included in the first speech signal; receiving an operation for starting a conversation; acquiring a second speech signal that includes a second utterance, using the microphone, after the operation has been received; recognizing whether or not a speaker of the second utterance is the first speaker, by comparing a feature value for the second utterance included in the second speech signal and the first speaker model; in a case where it has been recognized that the speaker of the second utterance is the first speaker, based on the language setting information, performing speech recognition in the first language on the second utterance included in the second speech signal, generating text in the first language corresponding to the second utterance that has been subjected to speech recognition in the first language, and translating the text in the first language corresponding to the second utterance into the second language; and, in a case where it has been recognized that the speaker of the second utterance is not the first speaker, based on the language setting information, performing speech recognition in the second language on the second utterance included in the second speech signal, generating text in the second language corresponding to the second utterance that has been subjected to speech recognition in the second language, and translating the text in the second language corresponding to the second utterance into the first language.

It should be noted that general or specific aspects hereof may be realized by a system, a method, an integrated circuit, a computer program, or a recording medium such as a computer-readable CD-ROM, and may be realized by an arbitrary combination of a system, a method, an integrated circuit, a computer program, and a recording medium.

With the information processing method of the present disclosure, a conversation that involves translation can be carried out smoothly.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIGS. 3A to 3C are drawings depicting an example of a situation in which the translation device translates a conversation between a first speaker and a second speaker in embodiment 1;

FIG. 6C is a flowchart depicting a detailed operation of regular translation processing in FIG. 5;

FIG. 12 is a block diagram depicting the configuration of a translation device in modified example 4 of embodiment 1;

FIG. 13B is a flowchart depicting details of processing for acquiring a second utterance in model generation and translation processing in modified example 4 of embodiment 1;

FIG. 13C is a flowchart depicting details of processing for acquiring a third utterance in regular translation processing in modified example 4 of embodiment 1;

FIG. 14 is a block diagram depicting the configuration of a translation device in modified example 5 of embodiment 1;

FIG. 15A is a flowchart depicting details of processing for acquiring a first utterance in setting processing in modified example 5 of embodiment 1;

FIG. 15B is a flowchart depicting details of processing for acquiring a second utterance in model generation and translation processing in modified example 5 of embodiment 1;

Figure 1:
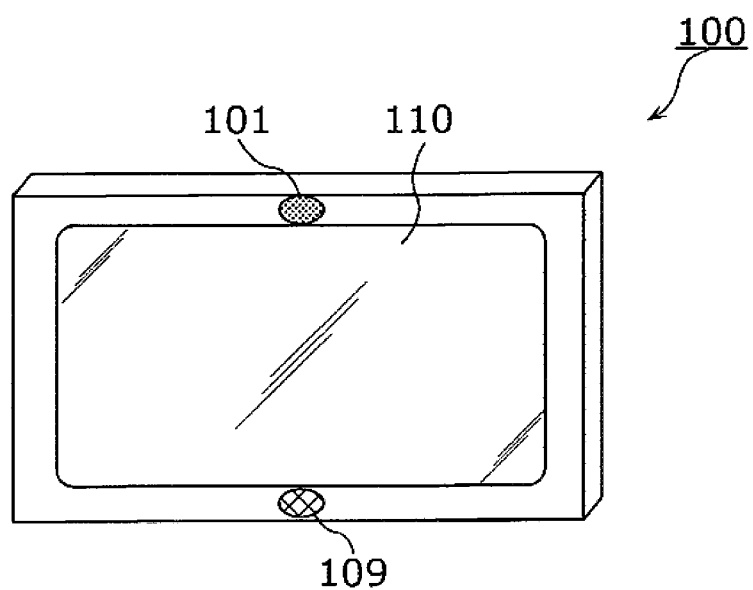
FIG. 1 is a drawing depicting an example of the external appearance of a translation device in embodiment 1.

DETAILED DESCRIPTION (Underlying Knowledge Forming Basis of the Present Disclosure)

Even if the techniques of the aforementioned Japanese Unexamined Patent Application Publication Nos. 2016-080916 and 2014-048514 are used, with a conventional translation device, it is not possible for a conversation that involves translation to be carried out smoothly. That is, in Japanese Unexamined Patent Application Publication No. 2016-080916, it is not possible to determine a translation language by merely detecting that the group of speakers engaged in a dialogue has changed. Furthermore, in Japanese Unexamined Patent Application Publication No. 2014-048514, the arrival direction of input speech is used for speech recognition, and therefore, if the positions of the speakers are not fixed, speech cannot be recognized, and consequently translation cannot be carried out.

Thus, the present disclosure provides an information processing method, an information processing device, and a recording medium having a program recorded thereon, with which a conversation that involves translation can be carried out smoothly.

An information processing method according to an aspect of the present disclosure includes:

setting, in a memory, language setting information that includes first language information having associated therein a first speaker and a first language spoken by the first speaker, and second language information having associated therein a second speaker and a second language that is a language spoken by the second speaker and is different from the first language;

acquiring a first speech signal that includes a first utterance of the first speaker, using a microphone;

generating a first speaker model that is a model of a feature value for an utterance of the first speaker, from the first utterance included in the first speech signal;

receiving an operation for starting a conversation;

acquiring a second speech signal that includes a second utterance, using the microphone, after the operation has been received;

recognizing whether or not a speaker of the second utterance is the first speaker, by comparing a feature value for the second utterance included in the second speech signal and the first speaker model;

in a case where it has been recognized that the speaker of the second utterance is the first speaker, based on the language setting information, performing speech recognition in the first language on the second utterance included in the second speech signal, generating text in the first language corresponding to the second utterance that has been subjected to speech recognition in the first language, and translating the text in the first language corresponding to the second utterance into the second language; and, in a case where it has been recognized that the speaker of the second utterance is not the first speaker, based on the language setting information, performing speech recognition in the second language on the second utterance included in the second speech signal, generating text in the second language corresponding to the second utterance that has been subjected to speech recognition in the second language, and translating the text in the second language corresponding to the second utterance into the first language.

Thus, if the languages spoken by each of the first speaker and the second speaker are set and the first speaker model is generated before an operation for starting a conversation is received, after the start of the conversation, for each utterance, the speaker of the utterance is recognized and translation from the language of the speaker into the language of the counterpart speaker is performed automatically. Consequently, a conversation that involves translation can be carried out smoothly without requiring time and labor such as with a conventional translation method or translation device. That is, a conversation can be carried out smoothly with there being fewer required operations since it is not necessary to carry out an operation for switching the translation language every time the first speaker and the second speaker speak. As a result, an improvement in usability can be achieved.

Furthermore, for example, in the information processing method, in addition, speaking order information that indicates the first speaker as the speaker who is to initially speak in a conversation between the first speaker and the second speaker may be set in the memory, in the acquiring of the first speech signal, a speech signal that includes an initial utterance from after the operation has been received may be acquired as the first speech signal, and, in the acquiring of the second speech signal, the second speech signal may be acquired after the first speaker model has been generated.

Thus, if the languages and the speaking order of the first speaker and the second speaker are set before the start of a conversation, after the start of the conversation, for each utterance, the speaker of the utterance is recognized and translation from the language of the speaker into the language of the counterpart speaker is performed automatically. Consequently, a conversation that involves translation can be carried out smoothly without requiring time and labor such as with a conventional translation method or translation device. That is, a conversation can be carried out smoothly with there being fewer required operations since it is not necessary to carry out an operation for switching the translation language every time the first speaker and the second speaker speak. As a result, an improvement in usability can be achieved.

For example, in the information processing method, in addition, in a case where the text in the first language corresponding to the second utterance is translated into the second language, the first speaker model may be updated using the feature value for the second utterance.

Thus, the first speaker model generated from the first utterance is updated using the feature value for the second utterance, and therefore the accuracy of the first speaker model can be increased, and the speaker of each utterance can be recognized with a high degree of accuracy. As a result, it is possible to suppress the generation of a translation in an incorrect language.

For example, in the information processing method, in addition, in a case where the text in the first language corresponding to the second utterance is translated into the second language, information indicating whether or not a language used for the translation is incorrect may be received from a user, whether or not the language used for the translation is incorrect may be determined based on the received information, and, when it has been determined that the language used for the translation is correct, the first speaker model may be updated using the feature value for the second utterance.

Thus, the first speaker model is updated in a case where the translation language for the second utterance is correct, and therefore it is possible to suppress the first speaker model being updated inappropriately due to a translation in an incorrect language.

For example, in the information processing method, in addition, when it has been determined that the language used for the translation is incorrect, speech recognition may be performed in the second language on the second utterance included in the second speech signal, text in the second language corresponding to the second utterance that has been subjected to speech recognition in the second language may be generated, and the text in the second language corresponding to the second utterance may be translated into the first language, and a second speaker model that is a model of a feature value for an utterance of the second speaker may be generated from the second utterance.

Thus, in a case where the translation language for the second utterance is incorrect, the second utterance included in the speech signal is subjected to speech recognition in the second language, text in the second language corresponding to the second utterance that has been subjected to speech recognition in the second language is generated, and the text in the second language corresponding to the second utterance is translated into the first language, and therefore it is possible to correct a translation of the content of the second utterance that has been performed in an incorrect language. In addition, since the second speaker model is generated, when an utterance is next acquired, a feature value for the utterance can be compared not only with the first speaker model but also with the second speaker model, and the speaker of the utterance can be recognized with a high degree of accuracy. As a result, it is possible to suppress the generation of a translation in an incorrect language.

For example, in the acquiring of the first speech signal, it may be determined whether or not a time length of an utterance included in an acquired speech signal is greater than or equal to a threshold value, and a speech signal that includes an utterance having a time length that is determined as being greater than or equal to the threshold value may be acquired as the first speech signal, and, in the acquiring of the second speech signal, it may be determined whether or not a time length of an utterance included in a speech signal acquired after the operation has been received is greater than or equal to a threshold value, and a speech signal that includes an utterance having a time length that is determined as being greater than or equal to the threshold value may be acquired as the second speech signal.

It is thereby possible to suppress an utterance that does not make sense being translated inappropriately, for example, and it is possible for a conversation that involves translation to be carried out smoothly.

For example, in the acquiring of the first speech signal, in addition, a sound signal that includes a sound picked up using the microphone may be acquired before the receiving of the operation for starting the conversation, it may be determined whether or not the sound signal acquired before the receiving of the operation is an utterance, and, in a case where it has been determined that the sound signal acquired before the receiving of the operation is an utterance, the sound signal acquired before the receiving of the operation may be acquired as the first speech signal, and, in the acquiring of the second speech signal, in addition, a sound signal that includes a sound picked up using the microphone may be acquired after the receiving of the operation for starting the conversation, it may be determined whether or not the sound signal acquired after the receiving of the operation is an utterance, and, in a case where it has been determined that the sound signal acquired after the receiving of the operation is an utterance, the sound signal acquired after the receiving of the operation may be acquired as the second speech signal.

Thus, for example, noise included in the first speech signal being treated as an utterance and being inappropriately translated is suppressed, and noise included in the second speech signal being treated as an utterance and being inappropriately translated does not occur, and therefore it is possible for a conversation that involves translation to be carried out smoothly.

For example, in the information processing method, in addition, in a case where it has been recognized that the speaker of the second utterance is not the first speaker, a second speaker model that is a model of a feature value for an utterance of the second speaker may be generated from the acquired second utterance, a third speech signal that includes a third utterance may be acquired using the microphone after the second speaker model has been generated, whether a speaker of the third utterance is the first speaker or the second speaker may be recognized by comparing a feature value for the third utterance included in the third speech signal and each of the first speaker model and the second speaker model, in a case where it has been recognized that the speaker of the third utterance is the first speaker, based on the language setting information, speech recognition may be performed in the first language on the third utterance included in the third speech signal, text in the first language corresponding to the third utterance that has been subjected to speech recognition in the first language may be generated, and the text in the first language corresponding to the third utterance may be translated into the second language, and, in a case where it has been recognized that the speaker of the third utterance is the second speaker, based on the language setting information, speech recognition may be performed in the second language on the third utterance included in the third speech signal, text in the second language corresponding to the third utterance that has been subjected to speech recognition in the second language may be generated, and the text in the second language corresponding to the third utterance may be translated into the first language.

Thus, since the second speaker model is generated, in a case where a third speech signal including a third utterance is acquired next, a feature value for the utterance can be compared not only with the first speaker model but also with the second speaker model, and the speaker of the third utterance can be recognized with a high degree of accuracy. As a result, it is possible to suppress the generation of a translation in an incorrect language.

For example, in the information processing method, in addition, in a case where it has been recognized that the speaker of the third utterance is not the first speaker or the second speaker by comparing the feature value for the third utterance and each of the first speaker model and the second speaker model, the third utterance may be rejected.

Thus, it is possible to suppress a third utterance that is not from the first speaker or the second speaker being translated. That is, it is possible to suppress a conversation that involves translation between a first speaker and a second speaker being disturbed by an utterance of a third speaker, and it is possible for the conversation to be carried out smoothly.

Furthermore, for example, the first speech signal may be acquired before the receiving of the operation for starting the conversation.

Furthermore, for example, in the information processing method, in addition, in a case where it has been recognized that the speaker of the second utterance is the first speaker, speech in the second language obtained by translating the text in the first language into the second language may be output using a loudspeaker, and, in a case where it has been recognized that the speaker of the second utterance is not the first speaker, speech in the first language obtained by translating the text in the second language into the first language may be output using the loudspeaker.

With this configuration, even in a case where the languages used in a conversation by the first speaker and the second speaker are different from each other, by hearing the speech that is output from the loudspeaker, the conversation between the first speaker and the second speaker can be carried out smoothly.

Furthermore, for example, in the information processing method, in addition, in a case where it has been recognized that the speaker of the second utterance is the first speaker, text in the first language and text in the second language obtained by translating the text in the first language into the second language may be displayed using a display, and, in a case where it has been recognized that the speaker of the second utterance is not the first speaker, text in the second language and text in the first language obtained by translating the text in the second language into the first language may be displayed using the display.

With this configuration, even in a case where the languages used in a conversation by the first speaker and the second speaker are different from each other, by confirming the text in the first language and the text in the second language that are displayed on the display, the conversation between the first speaker and the second speaker can be carried out smoothly.

It should be noted that general or specific aspects hereof may be realized by a system, a method, an integrated circuit, a computer program, or a recording medium such as a computer-readable CD-ROM, and may be realized by an arbitrary combination of a system, a method, an integrated circuit, a computer program, or a recording medium.

Hereinafter, embodiments will be described in a specific manner with reference to the drawings.

It should be noted that the embodiments described hereinafter all represent general or specific examples. The numerical values, the shapes, the materials, the constituent elements, the arrangement positions and modes of connection of the constituent elements, the steps, and the order of the steps and the like given in the following embodiments are examples and are not intended to limit the present disclosure. Furthermore, from among the constituent elements in the following embodiments, constituent elements that are not mentioned in the independent claims indicating the most significant concepts are described as optional constituent elements.

Furthermore, the drawings are schematic views and are not always depicted in an exact manner. Furthermore, in the drawings, the same constituent members are denoted by the same reference numbers. Furthermore, in the following embodiments, the information processing device and the information processing method in the present disclosure are respectively referred to as a translation device and a translation method.

Embodiment 1

<Overview>

FIG. 1 is a drawing depicting an example of the external appearance of a translation device in embodiment 1.

A translation device 100 constituting an information processing device is a device that translates a conversation between a first speaker who speaks in a first language and a second speaker who speaks in a second language. This kind of translation device 100 is configured in a card-like shape, for example, and is provided with: a sound pickup unit 101 corresponding to a microphone that acquires speech; a reproduction unit 109 corresponding to a loudspeaker that outputs a translation result as speech; and a display unit 110 corresponding to a display that displays the translation result as text. Furthermore, the translation device 100 includes an input interface (not depicted) corresponding to an input unit that receives input from a user. The input interface may be a keyboard, or a touch panel may serve as the input interface in a case where the aforementioned display is a touch panel display.

For example, a first speaker such as a store assistant or a security guard patrols or moves within an allocated area that has been assigned thereto while carrying the translation device 100, and converses with a second speaker who is a person the first speaker has encountered in that allocated area. At such time, in a case where the first language used in conversation by the first speaker and the second language used in conversation by the second speaker are different, the translation device 100 translates the content spoken by the first speaker into the second language and translates the content spoken by the second speaker into the first language. By doing so, the conversation between the first speaker and the second speaker is translated.

Figure 2A:
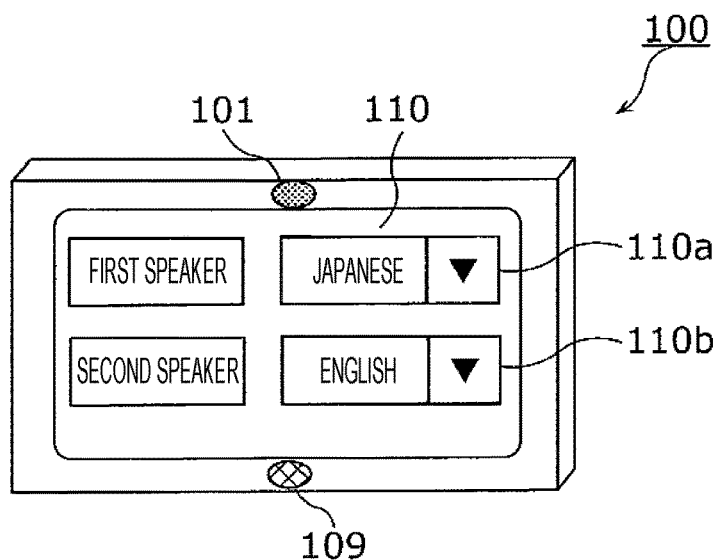
FIG. 2A is a drawing depicting an example of a language setting screen of the translation device in embodiment 1.

FIG. 2A is a drawing depicting an example of a language setting screen of the translation device 100.

The translation device 100 displays the language setting screen on the display unit 110 before a conversation is started. This language setting screen includes a first language setting field 110a for setting the language spoken by the first speaker, and a second language setting field 110b for setting the language spoken by the second speaker. A language that is spoken refers to a language that is used in a conversation. For example, the user of the translation device 100 inputs the first language that is the language spoken by the first speaker (Japanese, for example) into the first language setting field 110a by operating the input interface of the translation device 100. Furthermore, the user inputs the second language that is the language spoken by the second speaker (English, for example) into the second language setting field 110b by operating the translation device 100. It should be noted that the user may be the first speaker or the second speaker, or may be a person who is not the first speaker or the second speaker.

Thus, language setting information is set in a memory (not depicted) of the translation device 100, the language setting information including: first language information having associated therein the first speaker and the first language as the language spoken by the first speaker; and second language information having associated therein the second speaker and the second language spoken by the second speaker. That is, the translation device 100 generates language setting information that includes the first language information and the second language information, and sets the language setting information in the memory.

Figure 2B:
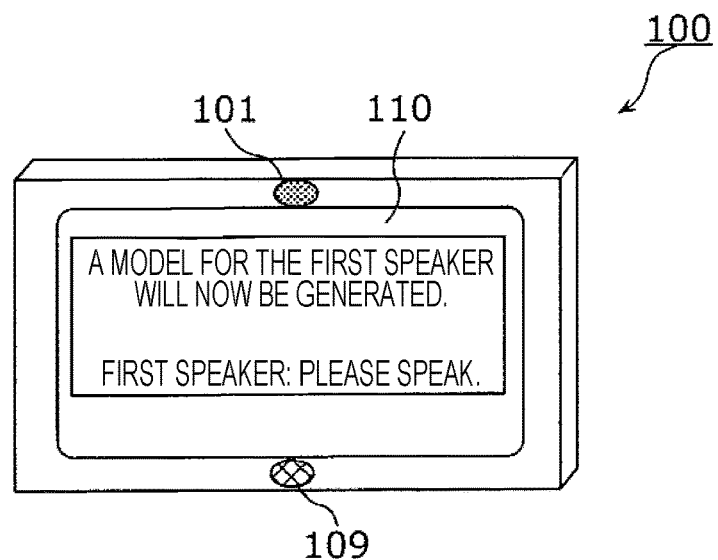
FIG. 2B is a drawing depicting an example of a model preparation screen of the translation device in embodiment 1.

FIG. 2B is a drawing depicting an example of a model preparation screen of the translation device 100.

The translation device 100 displays a model preparation screen for generating a first speaker model, on the display unit 110 before a conversation is started. The first speaker model is a model of a feature value for an utterance of the first speaker. For example, the message "A model for the first speaker will now be generated. First speaker: please speak." is shown on the model preparation screen.

At such time, the translation device 100 causes the sound pickup unit 101 to start acquiring ambient sounds. The first speaker who has seen the message then speaks. As a result, the sound pickup unit 101 of the translation device 100 picks up sounds that include an utterance of the first speaker, and acquires a speech signal corresponding to an electrical signal that includes the sounds that have been picked up. A signal that is obtained by converting the sounds including the utterance of the first speaker picked up by the sound pickup unit 101 into an electrical signal before a conversation is started is referred to as a first speech signal.

The translation device 100 generates the first speaker model by extracting a feature value for the first utterance included in the first speech signal. In other words, the translation device 100 acquires the first utterance of the first speaker from the first speech signal, and generates a first speaker model that is a model of a feature value for the utterance of the first speaker, from the acquired first utterance.

Figure 2C:
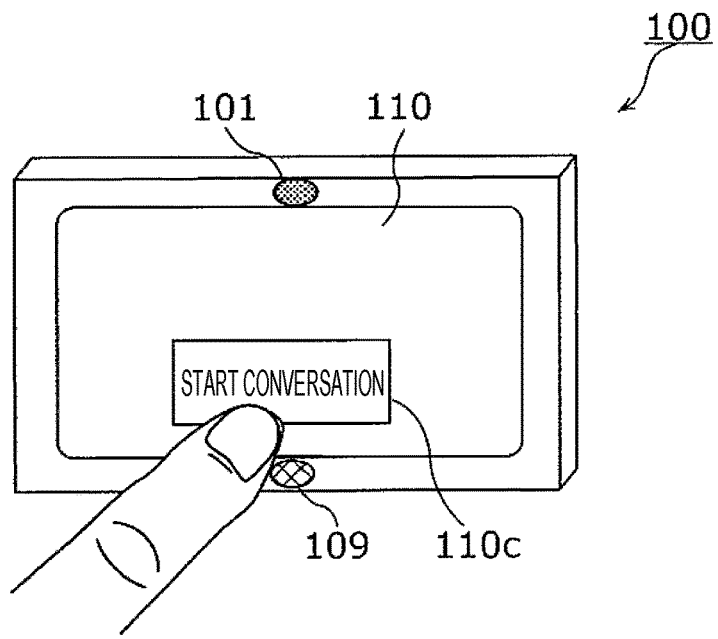
FIG. 2C is a drawing depicting an example of an operation for initiating the translation of a conversation by the translation device in embodiment 1.

FIG. 2C is a drawing depicting an example of an operation for initiating the translation of a conversation by the translation device 100.

When the first speaker model is generated, the translation device 100, for example, displays a conversation start button 110c on a touch panel display corresponding to the display unit 110. Here, the translation device 100 receives a conversation start operation when the conversation start button 110c is selected by a touch panel corresponding to the input interface being operated by the user, for example. The sound pickup unit 101 acquires a speech signal by picking up speech that has been spoken after the conversation start operation has been received and converting the speech into an electrical signal. As a result, the translation device 100, after the conversation start operation has been received, recognizes whether or not the speaker of the utterance included in the speech signal acquired by the sound pickup unit 101 is the first speaker. In a case where it has been recognized that it is the first speaker, the utterance included in the speech signal is subjected to speech recognition in the first language, and the content of the utterance that has been subjected to speech recognition is translated into the second language. Furthermore, in a case where it has been recognized that it is not the first speaker, the utterance included in the speech signal is subjected to speech recognition in the second language, and the content of the utterance that has been subjected to speech recognition is translated into the first language. The translation device 100 then displays the translation result on the display unit 110 as text, and outputs speech that includes the content of the text from the reproduction unit 109.

FIGS. 3A to 3C are drawings depicting an example of a situation in which the translation device 100 translates a conversation between the first speaker and the second speaker.

The language spoken by the first speaker being the first language (Japanese, for example) and the language spoken by the second speaker being the second language (English, for example) is set in advance in the translation device 100 by means of the aforementioned language setting screen. That is, the translation device 100 generates and retains the language setting information indicating this setting content. In addition, the first speaker model is generated in advance by means of the aforementioned model preparation screen in the translation device 100.

Thus, the first speaker says "Go yōken wa nan deshō ka?" in Japanese which is the first language, as depicted in FIG. 3A, for example. At such time, the translation device 100 recognizes that the speaker of the utterance "Go yōken wa nan deshō ka?" is the first speaker on the basis of the utterance and the first speaker model. In addition, the translation device 100 specifies the first language as the language of the utterance on the basis of the recognized first speaker and the language setting information. As a result, the translation device 100 recognizes the utterance "Go yōken wa nan deshō ka?" as Japanese, which is the first language, by means of speech recognition, and translates the Japanese text "Go yōken wa nan deshō ka?" corresponding to the content of the utterance obtained by the speech recognition carried out in Japanese, from Japanese into English, which is the second language. The English text "What is your purpose?" is obtained as a translation result.

The translation device 100 displays the text "What is your purpose?" obtained by translation into English, on the display unit 110 together with the pre-translation Japanese text "Go yōken wa nan deshō ka?". In addition, the translation device 100 carries out speech synthesis on the text "What is your purpose?" obtained by translation into English, thereby generates a speech synthesis signal that includes the English speech "What is your purpose?", and outputs the speech synthesis signal to the reproduction unit 109. The reproduction unit 109 outputs the English speech on the basis of the speech synthesis signal.

Next, the second speaker hears the translation result "What is your purpose?" as speech, reads this as text, and thereby understands the content spoken by the first speaker, as depicted in FIG. 3B. The second speaker then speaks the content that he or she wishes to say to the first speaker. For example, in a case where the second speaker wishes to ask the first speaker where the appliance department is, the second speaker says "Where is the appliance department?" in English, which is the second language. At such time, the translation device 100 recognizes that the speaker of the utterance "Where is the appliance department?" is the second speaker on the basis of the utterance and the first speaker model. In addition, the translation device 100 generates a second speaker model by extracting a feature value from the utterance "Where is the appliance department?". The second speaker model is a model of a feature value for the utterance of the second speaker.

In addition, the translation device 100 specifies the second language as the language of the utterance on the basis of the recognized second speaker and the language setting information. As a result, the translation device 100 recognizes the utterance "Where is the appliance department?" as English, which is the second language, by means of speech recognition. The translation device 100 then translates the English text "Where is the appliance department?" corresponding to the content of the utterance obtained by the speech recognition carried out in English, from English into Japanese, which is the first language. As a result of the translation into Japanese, the Japanese text "Denkaseihinuriba wa doko desu ka?" is obtained.

The translation device 100 displays the text "Denkaseihinuriba wa doko desu ka?" obtained by translation into Japanese, on the display unit 110 together with the pre-translation English text "Where is the appliance department?". In addition, the translation device 100 carries out speech synthesis on the text "Denkaseihinuriba wa doko desu ka?" obtained by translation into Japanese, thereby generates a synthesized speech signal that includes the Japanese speech "Denkaseihinuriba wa doko desu ka?", and outputs the synthesized speech signal to the reproduction unit 109. The reproduction unit 109 outputs the Japanese speech on the basis of the synthesized speech signal.

Next, the first speaker hears the translation result "Denkaseihinuriba wa doko desu ka?" as speech, reads this as text, and thereby understands the content spoken by the second speaker, as depicted in FIG. 3C. The first speaker speaks response content for the question to the second speaker. For example, in a case where the first speaker knows that the appliance department is on the third floor, the first speaker says "San kai ni gozaimasu" in Japanese, which is the first language. At such time, the translation device 100 recognizes that the speaker of the utterance "San kai ni gozaimasu" is the first speaker on the basis of that utterance, the first speaker model, and the second speaker model. In addition, the translation device 100 specifies the first language as the language of the utterance on the basis of the recognized first speaker and the language setting information. As a result, the translation device 100 recognizes the utterance "San kai ni gozaimasu" as Japanese, which is the language of the first speaker, by means of speech recognition. The translation device 100 then translates the Japanese text "San kai ni gozaimasu" corresponding to the content of the utterance obtained by the speech recognition carried out in Japanese, from Japanese into English, which is the second language. The English text "It is on the 3rd floor" is obtained as a result of the translation into English.

The translation device 100 displays the text "It is on the 3rd floor" obtained by translation into English, on the display unit 110 together with the pre-translation Japanese text "San kai ni gozaimasu". In addition, the translation device 100 carries out speech synthesis on the text "It is on the 3rd floor" obtained by translation, thereby generates a synthesized speech signal that includes the English speech "It is on the 3rd floor", and outputs the synthesized speech signal to the reproduction unit 109. The reproduction unit 109 outputs the English speech on the basis of the synthesized speech signal.

In this way, in the translation device 100 in the present embodiment, for each utterance, the speaker of the utterance is recognized and translation from the language of the speaker into the language of the counterpart speaker is performed automatically.

<Device Configuration>

Figure 4:
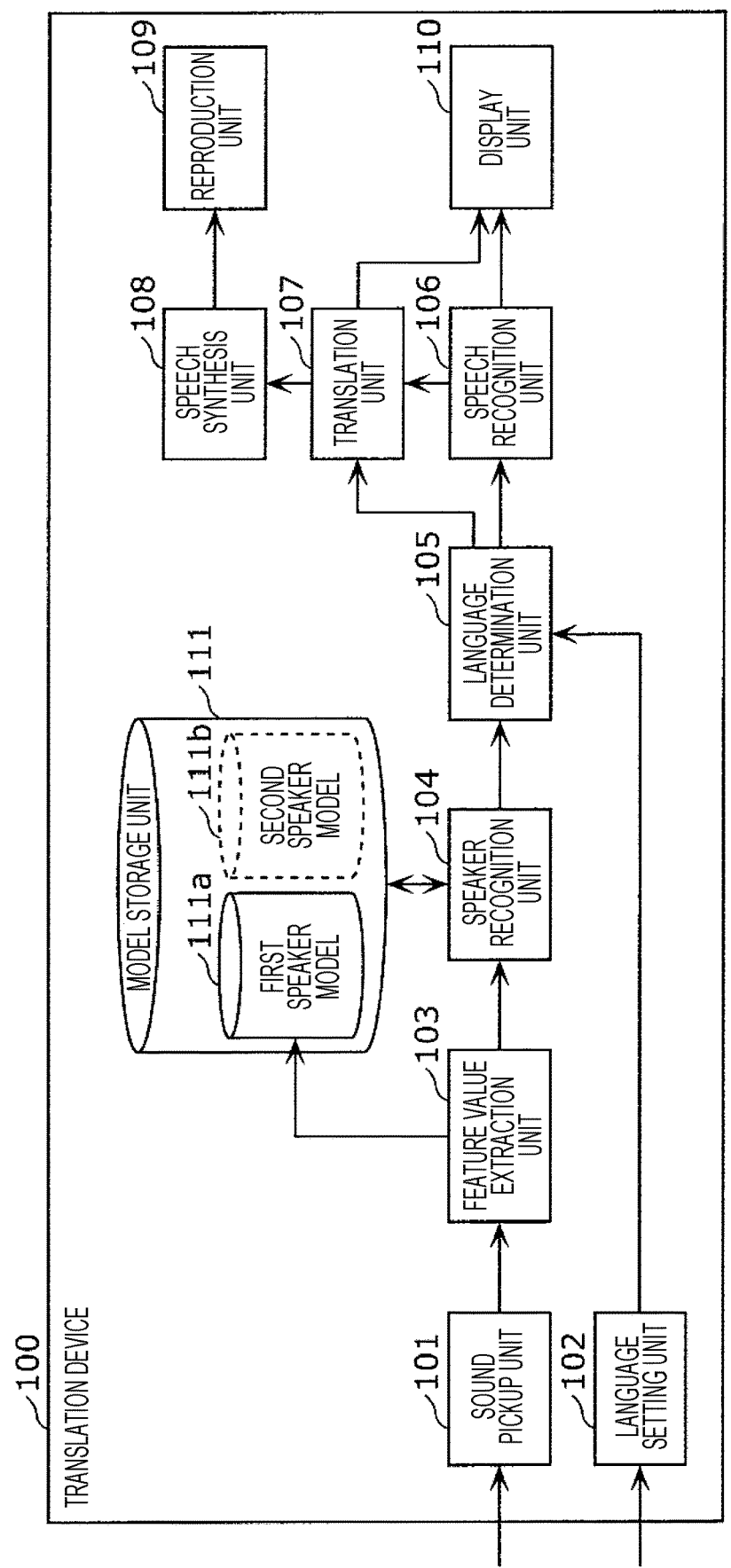
FIG. 4 is a block diagram depicting the configuration of the translation device in embodiment 1.

FIG. 4 is a block diagram depicting the configuration of the translation device 100 in the present embodiment.

The translation device 100 in the present embodiment is provided with the sound pickup unit 101, a language setting unit 102, a feature value extraction unit 103, a speaker recognition unit 104, a language determination unit 105, a speech recognition unit 106, a translation unit 107, a speech synthesis unit 108, the reproduction unit 109, the display unit 110, and a model storage unit 111. It should be noted that the language setting unit 102, the feature value extraction unit 103, the speaker recognition unit 104, the language determination unit 105, the speech recognition unit 106, the translation unit 107, and the speech synthesis unit 108 may be configured from at least one processing circuit.

The translation device 100 may be provided with a microphone (not depicted), a loudspeaker (not depicted), a display (not depicted), a processor (not depicted), an input interface (not depicted), and a memory (not depicted), for example, as a hardware configuration. The input interface may be, for example, a touch panel, a keyboard, or the like. Furthermore, the language setting unit 102, the feature value extraction unit 103, the speaker recognition unit 104, the language determination unit 105, the speech recognition unit 106, the translation unit 107, and the speech synthesis unit 108 may function as a result of a program being stored in the memory of the translation device 100 and the processor of the translation device 100 executing the program, for example.

Furthermore, the sound pickup unit 101, the reproduction unit 109, and the display unit 110 may each function as a result of the aforementioned processor executing the aforementioned program and thereby controlling the microphone, the loudspeaker, and the display.

Furthermore, the translation device 100 may be provided with a processing circuit (not depicted) that realizes the functions of each of the language setting unit 102, the feature value extraction unit 103, the speaker recognition unit 104, the language determination unit 105, the speech recognition unit 106, the translation unit 107, and the speech synthesis unit 108. The processing circuit may be an integrated circuit, for example.

The sound pickup unit 101 is a microphone as mentioned above, and picks up an ambient sounds and converts the collected sounds into an electrical signal, thereby acquiring an electrical signal that includes picked up sounds. That is, if a conversation is being carried out in the periphery of the microphone, the sound pickup unit 101 acquires a speech signal by converting sounds that include an utterance of the conversation into an electrical signal. For example, the sound pickup unit 101 outputs a speech signal by converting sounds that include the aforementioned utterance into an electrical signal.

The language setting unit 102 sets the languages of the first speaker and the second speaker by way of the language setting screen depicted in FIG. 2A. For example, the language setting unit 102 generates language setting information that includes first language information indicating a first language spoken by the first speaker (Japanese, for example), and second language information indicating a second language spoken by the second speaker (English, for example), and sets the language setting information in a memory. The language setting unit 102 outputs the language setting information that has been set in the memory, to the language determination unit 105, for example. For instance, the language setting information may be information indicating the association between the first speaker and the first language, and information indicating the association between the second speaker and the second language.

The feature value extraction unit 103 acquires the speech signal from the sound pickup unit 101, and thereby acquires the utterance included in the speech signal. That is, the feature value extraction unit 103 acquires the utterance as a speech signal from the sound pickup unit 101. The feature value extraction unit 103 then extracts a feature value for the utterance from the utterance included in the speech signal. This feature value, for example, is a feature vector, and more specifically, is an i-Vector that is used as one type of speaker recognition method. It should be noted that the feature value is not restricted to a feature vector such as this.

The speaker recognition unit 104 compares the feature value extracted by the feature value extraction unit 103 and the models stored in the model storage unit 111, and thereby recognizes the speaker of the utterance having that feature value. That is, the speaker recognition unit 104 determines whether the speaker of the utterance is the first speaker or the second speaker.

The language determination unit 105 determines the language of the utterance included in the speech signal acquired by the sound pickup unit 101, on the basis of the language setting information generated by the language setting unit 102 and the speaker determined by the speaker recognition unit 104. For example, in a case where the first speaker has been recognized by the speaker recognition unit 104, since the first language is associated with the first speaker in the language setting information, the language determination unit 105 determines the first language as being the language of the utterance. The language determination unit 105 outputs language information indicating the determined language to the speech recognition unit 106 and the translation unit 107.

The speech recognition unit 106 recognizes the utterance included in the speech signal acquired by the sound pickup unit 101, in the language determined by the language determination unit 105. That is, the speech recognition unit 106 performs speech recognition in the determined language on the utterance, and converts the utterance that has been subjected to speech recognition into text in the determined language.

The translation unit 107 translates the text generated by the speech recognition unit 106 into a language that is different from the language indicated in the language information determined by the language determination unit 105. That is, the generated text is translated into a language that is different from the language used for speech recognition. For example, in a case where the language indicated in the language information is the first language, the translation unit 107 translates text corresponding to the content of the utterance in the first language into the second language. It should be noted that this translation is carried out by means of, for example, rule-based or statistics-based machine translation, machine translation using a neural network, or the like.

The display unit 110 is configured from, for example, a liquid crystal display, organic light-emitting diodes, or the like, and displays the text generated by the speech recognition unit 106 and the text translated by the translation unit 107.

The speech synthesis unit 108 acquires the translated text from the translation unit 107, generates a synthesized speech signal that includes synthesized speech corresponding to the content of the text, and outputs the synthesized speech signal to the reproduction unit 109.

The reproduction unit 109 is a loudspeaker as mentioned above, and outputs synthesized speech included in the synthesized speech signal generated by the speech synthesis unit 108.

The model storage unit 111 is a recording medium for storing a first speaker model 111a, which is a model of a feature value for an utterance of the first speaker, and a second speaker model 111b, which is a model of a feature value for an utterance of the second speaker.

<Processing Operation>

Figure 5:
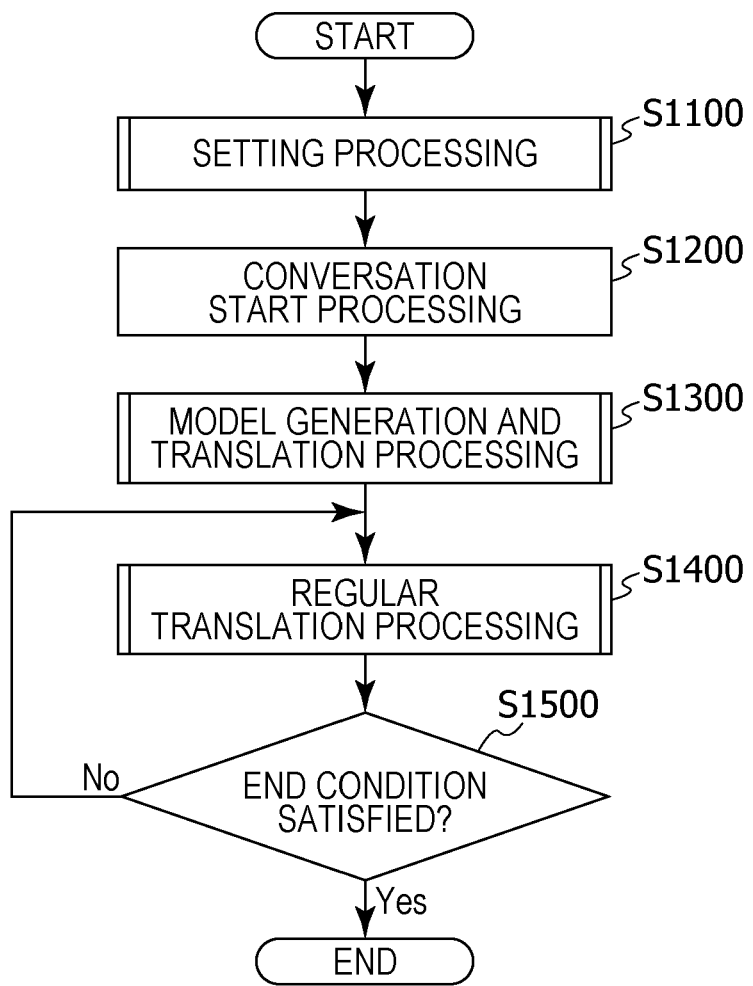
FIG. 5 is a flowchart depicting an overall processing operation performed by the translation device in embodiment 1.

FIG. 5 is a flowchart depicting an overall processing operation performed by the translation device 100 in the present embodiment.

First, the translation device 100 implements settings required in order to translate a conversation between the first speaker and the second speaker (step S1100). That is, the translation device 100 displays the screens depicted in FIGS. 2A and 2B, and sets, in a memory, language setting information that includes first language information indicating a first language spoken by the first speaker and second language information indicating a second language spoken by the second speaker, in accordance with information that is input from the user by way of an input interface such as a touch panel.

Next, after the screen depicted in FIG. 2B has been displayed, ambient sounds are picked up using the microphone corresponding to the sound pickup unit 101, a first utterance, more specifically, sounds including the first utterance are thereby converted into an electrical signal, and a first speech signal is thereby acquired. The feature value extraction unit 103 generates the first speaker model 111a on the basis of a feature value for the first utterance included in the first speech signal acquired from the sound pickup unit 101.

Next, the translation device 100 carries out conversation start processing (step S1200). That is, the translation device 100 receives a conversation start operation performed by the user. Specifically, the translation device 100 receives a selection operation for the conversation start button 110c depicted in FIG. 2C, starts acquiring ambient sounds by means of the sound pickup unit 101 after the selection operation has been received, thereby converts sounds that include an utterance into an electrical signal, and thereby acquires a speech signal.

Next, after having received the selection operation, the translation device 100, on the basis of an utterance of the second speaker included in the speech signal acquired by the sound pickup unit 101, carries out processing for generating the second speaker model 111b and also translating the content of the utterance (step S1300). Processing such as this will, hereinafter, be referred to as model generation and translation processing.

Next, the translation device 100 carries out processing in which the first speaker model 111a and the second speaker model 111b stored in the model storage unit 111 are used (step S1400). That is, after the first speaker model 111a and the second speaker model 111b have been generated, each time a speech signal including an utterance is acquired by the sound pickup unit 101, the translation device 100 recognizes whether the speaker of the utterance included in the speech signal is the first speaker or the second speaker, using the first speaker model 111a and the second speaker model 111b. In addition, the translation device 100 translates the content of the utterance into another language that is different from the language of the recognized speaker. Processing such as this will, hereinafter, be referred to as regular translation processing.

The translation device 100 then determines whether or not an end condition has been satisfied (step S1500), and ends the translation of the conversation when the end condition has been satisfied ("yes" in step S1500). However, the translation device 100 repeatedly executes the processing from step S1400 when it is determined that the end condition has not been satisfied ("no" in step S1500). For example, the end condition is that an operation to end the translation has been carried out in the translation device 100 by the speaker, or that a state in which an utterance has not been acquired has continued for a predetermined period.

Figure 6A:
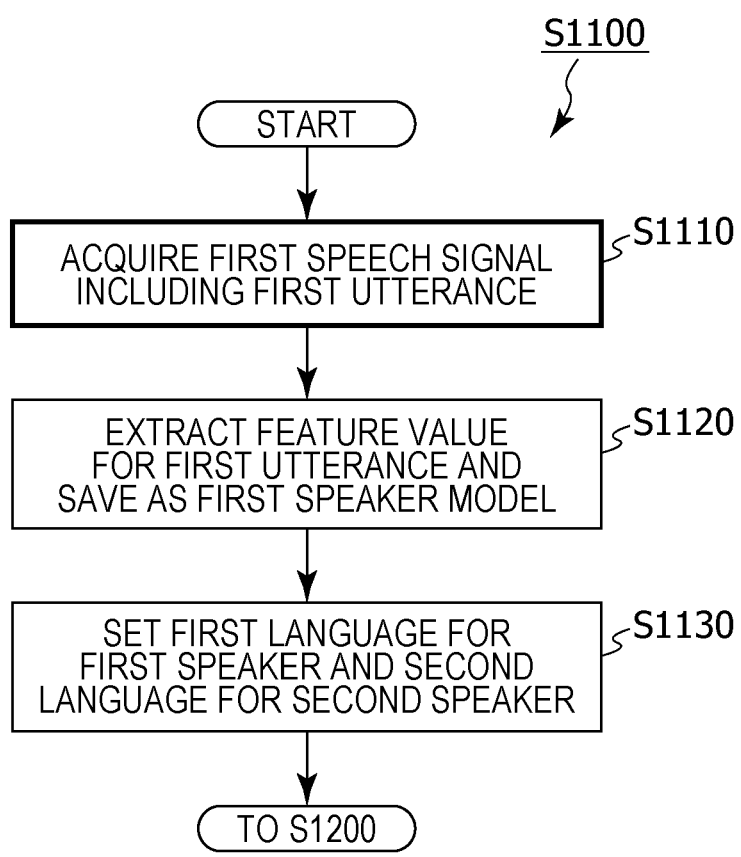
FIG. 6A is a flowchart depicting a detailed operation of setting processing in FIG. 5.

FIG. 6A is a flowchart depicting a detailed operation of the setting processing (step S1100) in FIG. 5.

First, the sound pickup unit 101 of the translation device 100 acquires a first speech signal corresponding to a speech signal that includes a first utterance of the first speaker (step S1110).

Next, the feature value extraction unit 103 extracts a feature value for the first utterance included in the acquired first speech signal, and saves the feature value as a first speaker model 111a in the model storage unit 111 (step S1120). That is, the feature value extraction unit 103 generates a first speaker model that is a model of the feature value for the utterance of the first speaker, on the basis of the first utterance included in the acquired speech signal.

The language setting unit 102 then sets the first language with respect to the first speaker and sets the second language with respect to the second speaker in accordance with a user operation of the translation device 100 (step S1130). According to this setting, the language setting unit 102 generates language setting information, sets this in the memory, and also outputs the language setting information that has been set to the language determination unit 105.

In the flowchart depicted in FIG. 6A, the processing of step S1130 is carried out after steps S1110 and S1120; however, it should be noted that the order thereof may be reversed. That is, the processing of steps S1110 and S1120 may be carried out after step S1130.

Figure 6B:
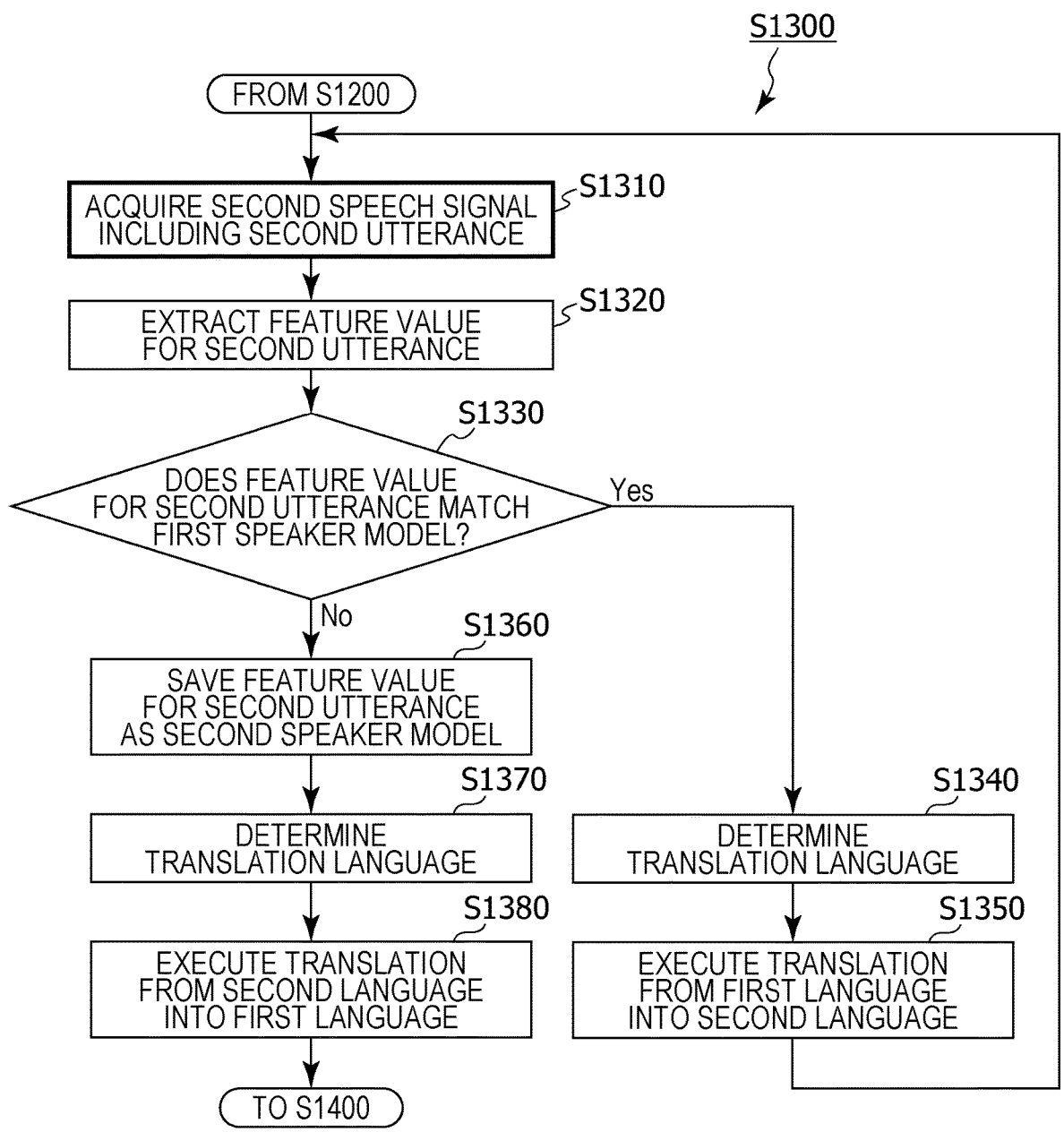
FIG. 6B is a flowchart depicting a detailed operation of model generation and translation processing in FIG. 5.

FIG. 6B is a flowchart depicting a detailed operation of the model generation and translation processing (step S1300) in FIG. 5.

First, the sound pickup unit 101 of the translation device 100 acquires a second speech signal corresponding to a speech signal that includes a second utterance (step S1310). In step S1310, the second speech signal that includes the second utterance is obtained by converting the sound picked up by the sound pickup unit 101 into an electrical signal after the processing of steps S1110 to S1130 depicted in FIG. 6A have ended, for example.

Next, the feature value extraction unit 103 extracts a feature value for the second utterance included in the acquired second speech signal (step S1320).

The speaker recognition unit 104 determines whether or not the feature value for the second utterance included in the second speech signal matches the first speaker model 111a (step S1330). That is, the speaker recognition unit 104 recognizes whether or not the speaker of the second utterance is the first speaker by comparing the acquired feature value for the second utterance and the first speaker model 111a.

For example, in a case where the feature value for the second utterance and the first speaker model 111a are each represented as feature vectors, the speaker recognition unit 104 determines that the feature value for the second utterance matches the first speaker model 111a if the distance between those feature vectors is less than or equal to a threshold value. However, the speaker recognition unit 104 determines that the feature value for the second utterance does not match the first speaker model 111a if the distance is greater than the threshold value.

Here, the speaker recognition unit 104, when having determined in step S1330 that the feature value for the second utterance matches the first speaker model 111a ("yes" in step S1330), recognizes the speaker of the second utterance as being the first speaker. As a result, the language determination unit 105 determines the language of the second utterance as being the language associated with the first speaker in the language setting information (step S1340). For example, the language determination unit 105 determines the language of the second utterance as being the first language.

The speech recognition unit 106 then performs speech recognition in the first language on the second utterance included in the second speech signal, and generates text in the first language corresponding to the second utterance that has been subjected to speech recognition in the first language. The translation unit 107 translates the text in the first language corresponding to the second utterance into the second language. The speech synthesis unit 108 generates a synthesized speech signal that includes synthesized speech in the second language corresponding to the content of the text in the second language generated by the aforementioned translation, and outputs the synthesized speech signal to the reproduction unit 109. The loudspeaker corresponding to the reproduction unit 109 outputs the synthesized speech in the second language on the basis of the synthesized speech signal. Furthermore, the pre-translation text in the first language and the text in the second language obtained by translating the text in the first language into the second language are displayed by the display unit 110 (step S1350).

That is, in steps S1340 and S1350, in a case where it has been recognized in step S1330 that the speaker of the second utterance is the first speaker, the translation device 100 translates the content of the second utterance spoken in the first language, from the first language into the second language on the basis of the language setting information.

However, the speaker recognition unit 104, when having determined that the feature value for the second utterance does not match the first speaker model 111a ("no" in step S1330), recognizes the speaker of the second utterance as being the second speaker not the first speaker. As a result, the speaker recognition unit 104 saves the feature value for the second utterance as the second speaker model 111b in the model storage unit 111 (step S1360). The language determination unit 105 then determines the language of the second utterance as being the language associated with the second speaker in the language setting information (step S1370). For example, the language determination unit 105 determines the language of the second utterance as being the second language.

The speech recognition unit 106 then performs speech recognition in the second language on the second utterance included in the second speech signal, and generates text in the second language corresponding to the second utterance that has been subjected to speech recognition in the second language. The translation unit 107 translates the text in the second language corresponding to the second utterance into the first language. The speech synthesis unit 108 generates a synthesized speech signal that includes synthesized speech in the first language corresponding to the content of the text in the first language generated by the aforementioned translation, and outputs the synthesized speech signal to the reproduction unit 109. The loudspeaker corresponding to the reproduction unit 109 outputs the synthesized speech in the first language on the basis of the synthesized speech signal. Furthermore, the pre-translation text in the second language and the text in the first language obtained by translating the text in the second language into the first language are displayed by the display unit 110 (step S1380).

That is, in steps S1360 and S1380, in a case where it has been recognized in step S1330 that the speaker of the second utterance is not the first speaker, the translation device 100 translates the content of the acquired second utterance from the second language into the first language on the basis of the language setting information. In addition, in a case where it has been recognized in step S1330 that the speaker of the second utterance is not the first speaker, the translation device 100 generates the second speaker model 111b that is a model of a feature value for the utterance of the second speaker, from the acquired second utterance.

FIG. 6C is a flowchart depicting a detailed operation of the regular translation processing (step S1400) in FIG. 5.

First, the sound pickup unit 101 of the translation device 100 acquires a third speech signal corresponding to a speech signal that includes a third utterance (step S1410). The third speech signal in step S1410 is obtained by converting a sound picked up by the sound pickup unit 101 into an electrical signal after step S1380 depicted in FIG. 6B has ended, for example. Naturally, the second speech signal is obtained by converting the sound picked up by the sound pickup unit 101 into an electrical signal before the third speech signal is acquired.

Next, the feature value extraction unit 103 extracts a feature value for the third utterance included in the acquired third speech signal (step S1420).

The speaker recognition unit 104 determines whether or not the feature value for the third utterance included in the third speech signal matches the first speaker model 111a or the second speaker model 111b (step S1430). For example, the speaker recognition unit 104 determines whether or not there is a match on the basis of the distance between two feature vectors as mentioned above. That is, the speaker recognition unit 104 recognizes whether the speaker of the acquired third utterance is the first speaker or the second speaker by comparing the acquired feature value for the third utterance with each of the first speaker model 111a and the second speaker model 111b.

Here, the speaker recognition unit 104, when having determined in step S1430 that the feature value for the third utterance matches the first speaker model 111a, recognizes the speaker of the third utterance as being the first speaker. As a result, the language determination unit 105 determines the language of the third utterance as being the language associated with the first speaker in the language setting information (step S1440). For example, the language determination unit 105 determines the language of the third utterance as being the first language.

The speech recognition unit 106 then performs speech recognition in the first language on the third utterance included in the third speech signal, and generates text in the first language corresponding to the third utterance that has been subjected to speech recognition in the first language. The translation unit 107 translates the text in the first language corresponding to the third utterance into the second language. The speech synthesis unit 108 generates a synthesized speech signal that includes synthesized speech in the second language corresponding to the content of the text in the second language generated by the aforementioned translation, and outputs the synthesized speech signal to the reproduction unit 109. The loudspeaker corresponding to the reproduction unit 109 outputs the synthesized speech in the second language on the basis of the synthesized speech signal. Furthermore, the pre-translation text in the first language and the text in the second language obtained by translating the text in the first language into the second language are displayed by the display unit 110 (step S1450).

That is, in steps S1440 and S1450, in a case where it has been recognized in step S1430 that the speaker of the third utterance is the first speaker, the translation device 100 translates the acquired third utterance from the first language into the second language on the basis of the language setting information.

However, the speaker recognition unit 104, when having determined in step S1430 that the feature value for the third utterance matches the second speaker model 111b, recognizes the speaker of the third utterance as being the second speaker. As a result, the language determination unit 105 determines the language of the third utterance as being the language associated with the second speaker in the language setting information (step S1460). For example, the language determination unit 105 determines the language of the third utterance as being the second language.

The speech recognition unit 106 then performs speech recognition in the second language on the third utterance included in the third speech signal, and generates text in the second language corresponding to the third utterance that has been subjected to speech recognition in the second language. The translation unit 107 translates the text in the second language corresponding to the third utterance into the first language. The speech synthesis unit 108 generates a synthesized speech signal that includes synthesized speech in the first language corresponding to the content of the text in the first language generated by the aforementioned translation, and outputs the synthesized speech signal to the reproduction unit 109. The loudspeaker corresponding to the reproduction unit 109 outputs the synthesized speech in the first language on the basis of the synthesized speech signal. Furthermore, the pre-translation text in the second language and the text in the first language obtained by translating the text in the second language into the first language are displayed by the display unit 110 (step S1470).

That is, in steps S1460 and S1470, in a case where it has been recognized in step S1430 that the speaker of the third utterance is the second speaker, the translation device 100 translates the acquired third utterance from the second language into the first language on the basis of the language setting information.

As mentioned above, in the translation device 100 in the present embodiment, if the languages of each of the first speaker and the second speaker are set before the start of a conversation and the first speaker model 111a is generated, after the start of a conversation, for each utterance, the speaker of the utterance is recognized and translation from the language of the speaker into the language of the counterpart speaker is performed automatically. Consequently, a conversation that involves translation can be carried out smoothly without requiring time and labor such as with a conventional translation method or translation device. That is, a conversation can be carried out smoothly with there being fewer required operations since it is not necessary to carry out an operation for switching the translation language every time the first speaker and the second speaker speak. As a result, an improvement in usability can be achieved.

Furthermore, in the present embodiment, if the first speaker model 111a is generated on the basis of a large number of utterances of the first speaker before the start of a conversation, the accuracy of the first speaker model 111a can be increased. In addition, the speaker of the initial utterance after the start of a conversation may be the first speaker or may be the second speaker.

Modified Example 1

Figure 7:
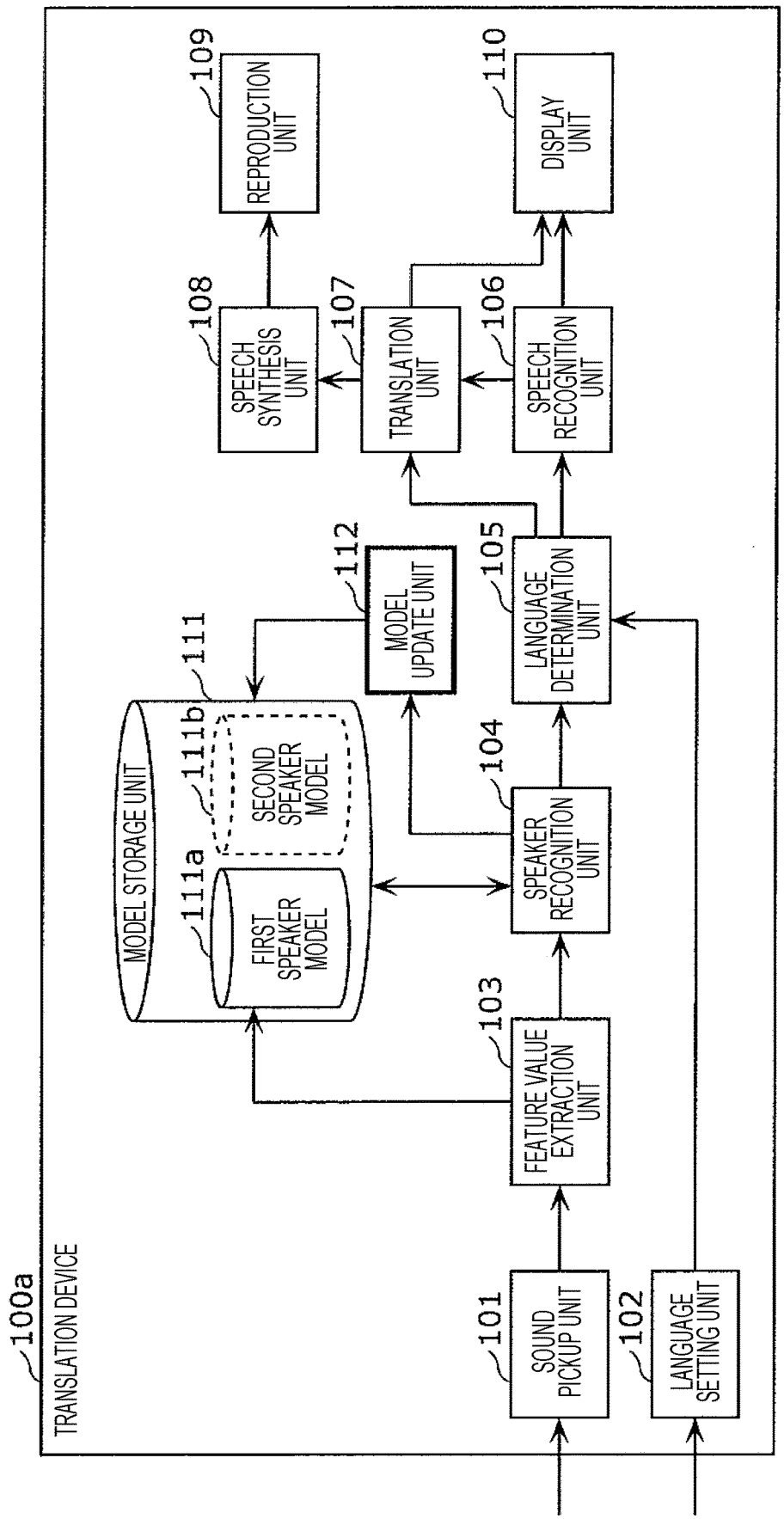
FIG. 7 is a block diagram depicting the configuration of a translation device in modified example 1 of embodiment 1.

FIG. 7 is a block diagram depicting the configuration of a translation device in modified example 1 of embodiment 1.

A translation device 100a in the present modified example is provided with a model update unit 112 in addition to the constituent elements of the translation device 100 in embodiment 1. For example, the model update unit 112 may function by means of a program that realizes the function of the model update unit 112 being stored in a memory of the translation device 100a and a processor of the translation device 100a executing the program. Alternatively, the translation device 100a may be provided with a processing circuit that realizes the function of the model update unit 112.

When the speaker of an utterance is recognized by the speaker recognition unit 104, the model update unit 112 uses the utterance to update the first speaker model 111a or the second speaker model 111b corresponding to the speaker.

The overall processing operation in the translation device 100a of the present modified example is the same as the operation depicted in FIG. 5 performed by the translation device 100 of embodiment 1. However, in the present modified example, the details of the model generation and translation processing (step S1300) and the details of the regular translation processing (step S1400) are different from those in embodiment 1.

Figure 8A:
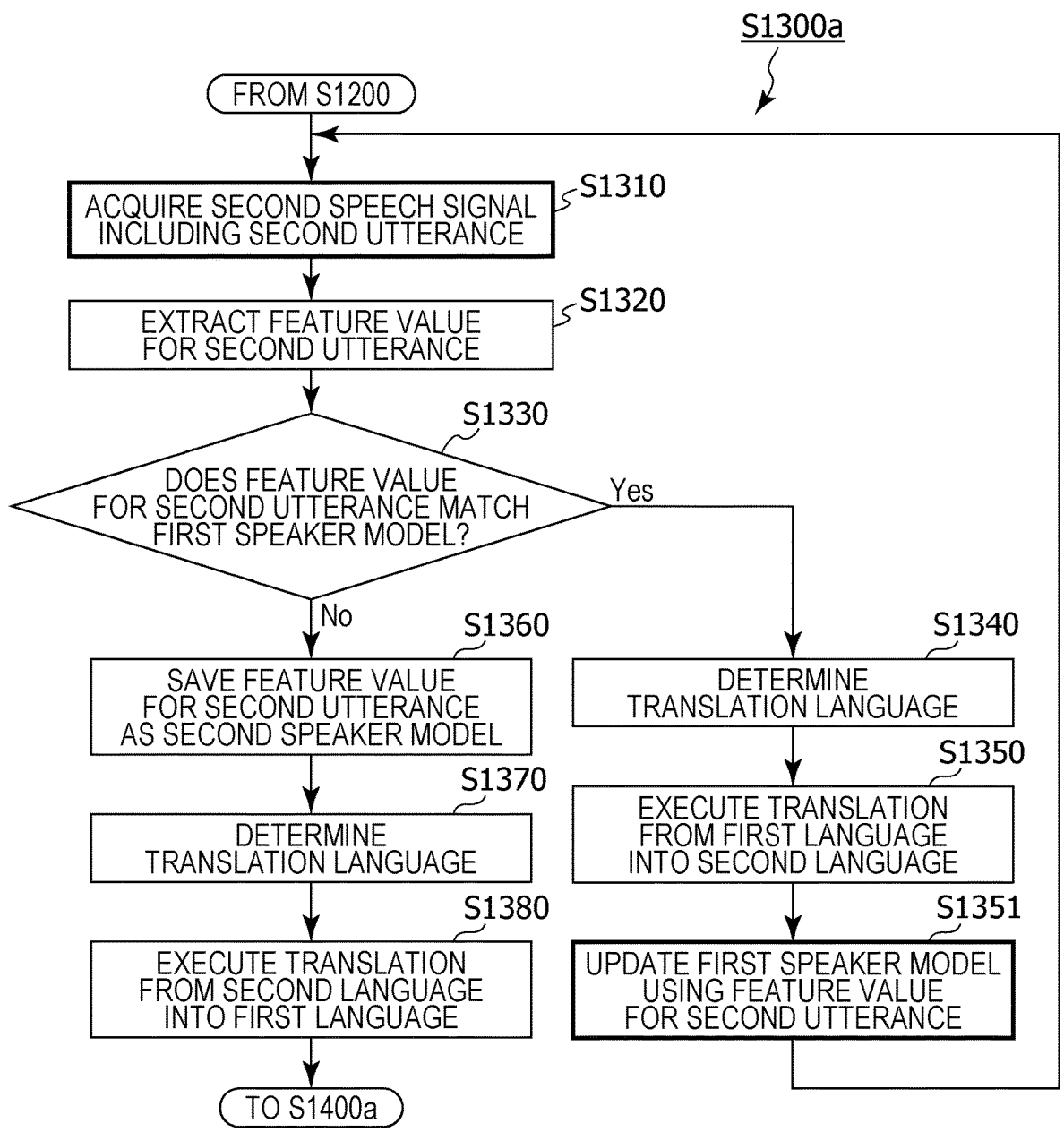
FIG. 8A is a flowchart depicting a detailed operation of model generation and translation processing in modified example 1 of embodiment 1.

FIG. 8A is a flowchart depicting a detailed operation of the model generation and translation processing in the present modified example.

The model generation and translation processing (step S1300a) in the present modified example corresponds to the model generation and translation processing (step S1300) in FIG. 5 and includes all of the steps of the flowchart depicted in FIG. 6B. In addition, the model generation and translation processing (step S1300a) in the present modified example includes processing in which the model update unit 112 updates the first speaker model 111a using the feature value for the second utterance (step S1351).

That is, the speaker recognition unit 104, when having determined in step S1330 that the feature value for the second utterance matches the first speaker model 111a ("yes" in step S1330), recognizes the speaker of the second utterance as being the first speaker. As a result, the language determination unit 105 determines the language of the second utterance as being the language associated with the first speaker in the language setting information (step S1340). For example, the language determination unit 105 determines the language of the second utterance as being the first language.

The speech recognition unit 106 then performs speech recognition in the first language on the second utterance included in the second speech signal, and generates text in the first language corresponding to the second utterance that has been subjected to speech recognition in the first language. The translation unit 107 translates the text in the first language corresponding to the second utterance into the second language. The speech synthesis unit 108 generates a synthesized speech signal that includes synthesized speech in the second language corresponding to the content of the text in the second language generated by the aforementioned translation, and outputs the synthesized speech signal to the reproduction unit 109. The loudspeaker corresponding to the reproduction unit 109 outputs the synthesized speech in the second language on the basis of the synthesized speech signal. Furthermore, the pre-translation text in the first language and the text in the second language obtained by translating the text in the first language into the second language are displayed by the display unit 110 (step S1350).

Here, in the present modified example, after step S1350, the model update unit 112 updates the first speaker model 111a using the feature value for the second utterance (step S1351). For example, in a case where the feature value is represented by an i-Vector, the model update unit 112 combines a speech signal of an utterance used to generate or update the first speaker model 111a and a speech signal of the second utterance. A combined speech signal generated by this combining indicates the second utterance and a past utterance from before the second utterance. The model update unit 112 then updates the first speaker model 111a by generating a new i-Vector from the combined speech signal and replacing the pre-update first speaker model 111a with the new i-Vector.

It should be noted that, in the present modified example, in order for the first speaker model 111a and the second speaker model 111b to be updated, speech signals that are used to generate and update those models are saved in the model storage unit 111. That is, the feature value extraction unit 103, the speaker recognition unit 104, and the model update unit 112 save speech signals that are used to generate or update the first speaker model 111a and the second speaker model 111b, in the model storage unit 111 when performing the generating or updating. It should be noted that this kind of updating of a model is an example, and the updating is not restricted to this example.

In this way, in the present modified example, in a case where the content of the second utterance is translated from the first language into the second language, the first speaker model 111a is updated using the feature value for the second utterance. Thus, since the first speaker model 111a generated from the first utterance is updated using the feature value for the second utterance, the accuracy of the first speaker model 111a can be increased, and the speaker of each utterance can be recognized with a high degree of accuracy. As a result, it is possible to suppress the generation of a translation in an incorrect language.

Figure 8B:
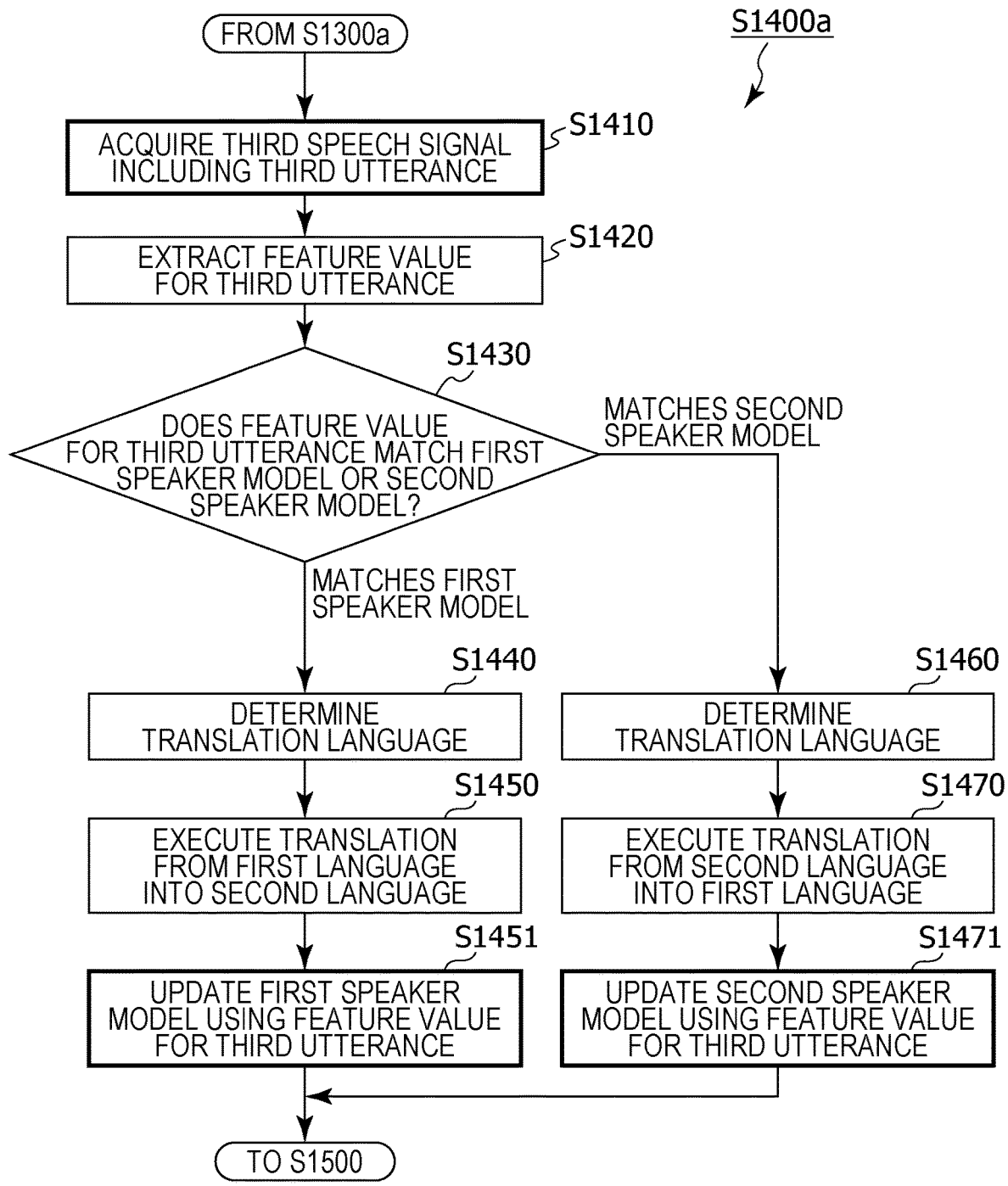
FIG. 8B is a flowchart depicting a detailed operation of regular translation processing in modified example 1 of embodiment 1.

FIG. 8B is a flowchart depicting a detailed operation of the regular translation processing in the present modified example.

The regular translation processing (step S1400a) in the present modified example corresponds to the regular translation processing (step S1400) in FIG. 5 and includes all of the steps of the flowchart depicted in FIG. 6C. In addition, the regular translation processing (step S1400a) in the present modified example includes processing in which the model update unit 112 selectively updates the first speaker model 111a and the second speaker model 111b using the feature value for the third utterance (steps S1451 and S1471).

That is, the speaker recognition unit 104, when having determined in step S1430 that the feature value for the third utterance matches the first speaker model 111a, recognizes the speaker of the third utterance as being the first speaker. As a result, the language determination unit 105 determines the language of the third utterance as being the language associated with the first speaker in the language setting information (step S1440). For example, the language determination unit 105 determines the language of the third utterance as being the first language.

The speech recognition unit 106 then performs speech recognition in the first language on the third utterance included in the third speech signal, and generates text in the first language corresponding to the third utterance that has been subjected to speech recognition in the first language. The translation unit 107 translates the text in the first language corresponding to the third utterance into the second language. The speech synthesis unit 108 generates a synthesized speech signal that includes synthesized speech in the second language corresponding to the content of the text in the second language generated by the aforementioned translation, and outputs the synthesized speech signal to the reproduction unit 109. The loudspeaker corresponding to the reproduction unit 109 outputs the synthesized speech in the second language on the basis of the synthesized speech signal. Furthermore, the pre-translation text in the first language and the text in the second language obtained by translating the text in the first language into the second language are displayed by the display unit 110 (step S1450).

Here, in the present modified example, after step S1450, the model update unit 112 updates the first speaker model 111a using the feature value for the third utterance (step S1451). For example, the model update unit 112 generates a combined speech signal as mentioned above, and updates the first speaker model 111a using the combined speech signal.

Furthermore, the speaker recognition unit 104, when having determined in step S1430 that the feature value for the third utterance matches the second speaker model 111b, recognizes the speaker of the third utterance as being the second speaker. As a result, the language determination unit 105 determines the language of the third utterance as being the language associated with the second speaker in the language setting information (step S1460). For example, the language determination unit 105 determines the language of the third utterance as being the second language.

The speech recognition unit 106 then performs speech recognition in the second language on the third utterance included in the third speech signal, and generates text in the second language corresponding to the third utterance that has been subjected to speech recognition in the second language. The translation unit 107 translates the text in the second language corresponding to the third utterance into the first language. The speech synthesis unit 108 generates a synthesized speech signal that includes synthesized speech in the first language corresponding to the content of the text in the first language generated by the aforementioned translation, and outputs the synthesized speech signal to the reproduction unit 109. The loudspeaker corresponding to the reproduction unit 109 outputs the synthesized speech in the first language on the basis of the synthesized speech signal. Furthermore, the pre-translation text in the second language and the text in the first language obtained by translating the text in the second language into the first language are displayed by the display unit 110 (step S1470).

Here, in the present modified example, after step S1470, the model update unit 112 updates the second speaker model 111b using the feature value for the third utterance (step S1471). For example, the model update unit 112 generates a combined speech signal as mentioned above, and updates the second speaker model 111b using the combined speech signal.

In this way, in the present modified example, in a case where an utterance is translated, the model update unit 112 updates, using the feature value for the utterance, a model that has already been generated and corresponds to the speaker who has been recognized with respect to the utterance, out of the first speaker model 111a and the second speaker model 111b. Thus, a model that has already been generated is updated using a feature value for an utterance, and therefore the accuracy of the model can be increased, and the speaker of each utterance can be recognized with a high degree of accuracy. As a result, it is possible to suppress the generation of a translation in an incorrect language.

Modified Example 2

Figure 9:
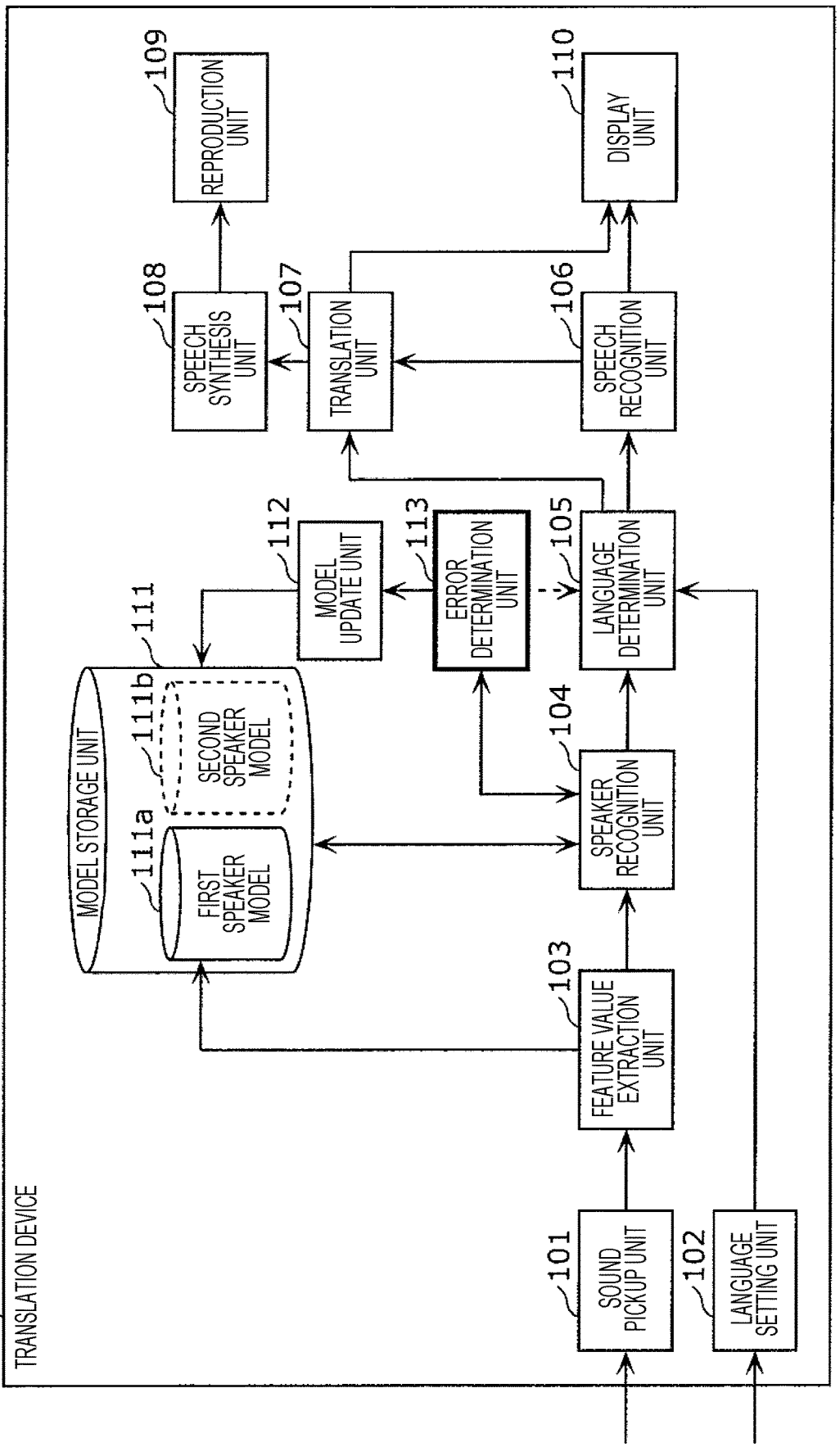
FIG. 9 is a block diagram depicting the configuration of a translation device in modified example 2 of embodiment 1.

FIG. 9 is a block diagram depicting the configuration of a translation device in modified example 2 of embodiment 1.

A translation device 100b in the present modified example is provided with an error determination unit 113 in addition to the constituent elements of the translation device 100a in modified example 1. For example, the error determination unit 113 may function by means of a program that realizes the function of the error determination unit 113 being stored in a memory of the translation device 100*b* and a processor of the translation device 100*b* executing the program. Alternatively, the translation device 100*b* may be provided with a processing circuit that realizes the function of the error determination unit 113.

The error determination unit 113 determines whether or not the language of the speech that is output from the reproduction unit 109 due to a translation and the language of the text that is displayed on the display unit 110 due to a translation are incorrect in accordance with a user operation with respect to the translation device 100*b*. For example, when a button displayed on the display unit 110 is selected by means of a user operation, the error determination unit 113 determines that the language for that translation is incorrect. Furthermore, in a case where that button has not been selected even though a predetermined time has elapsed from the point in time at which a translation was carried out, the error determination unit 113 determines that the language for that translation was not incorrect. Alternatively, in a case where a speech signal that includes the next utterance has been acquired by the sound pickup unit 101 before a predetermined time has elapsed from the point in time at which a translation was carried out, the error determination unit 113 determines that the language for that translation was not incorrect.

The model update unit 112 in the present modified example updates the first speaker model 111*a* or the second speaker model 111*b* when it is determined by the error determination unit 113 that the language of the speech and the text is not incorrect. That is, when the speaker of an utterance is recognized by the speaker recognition unit 104, in a case where the translation language is not incorrect, the model update unit 112 updates the first speaker model 111*a* or the second speaker model 111*b* corresponding to the speaker, using the feature value for the utterance.

The overall processing operation in the translation device 100*b* of the present modified example is the same as the operation depicted in FIG. 5 performed by the translation device 100 of embodiment 1. However, in the present modified example, the details of the model generation and translation processing (step S1300) and the details of the regular translation processing (step S1400) are different from those in embodiment 1.

Figure 10A:
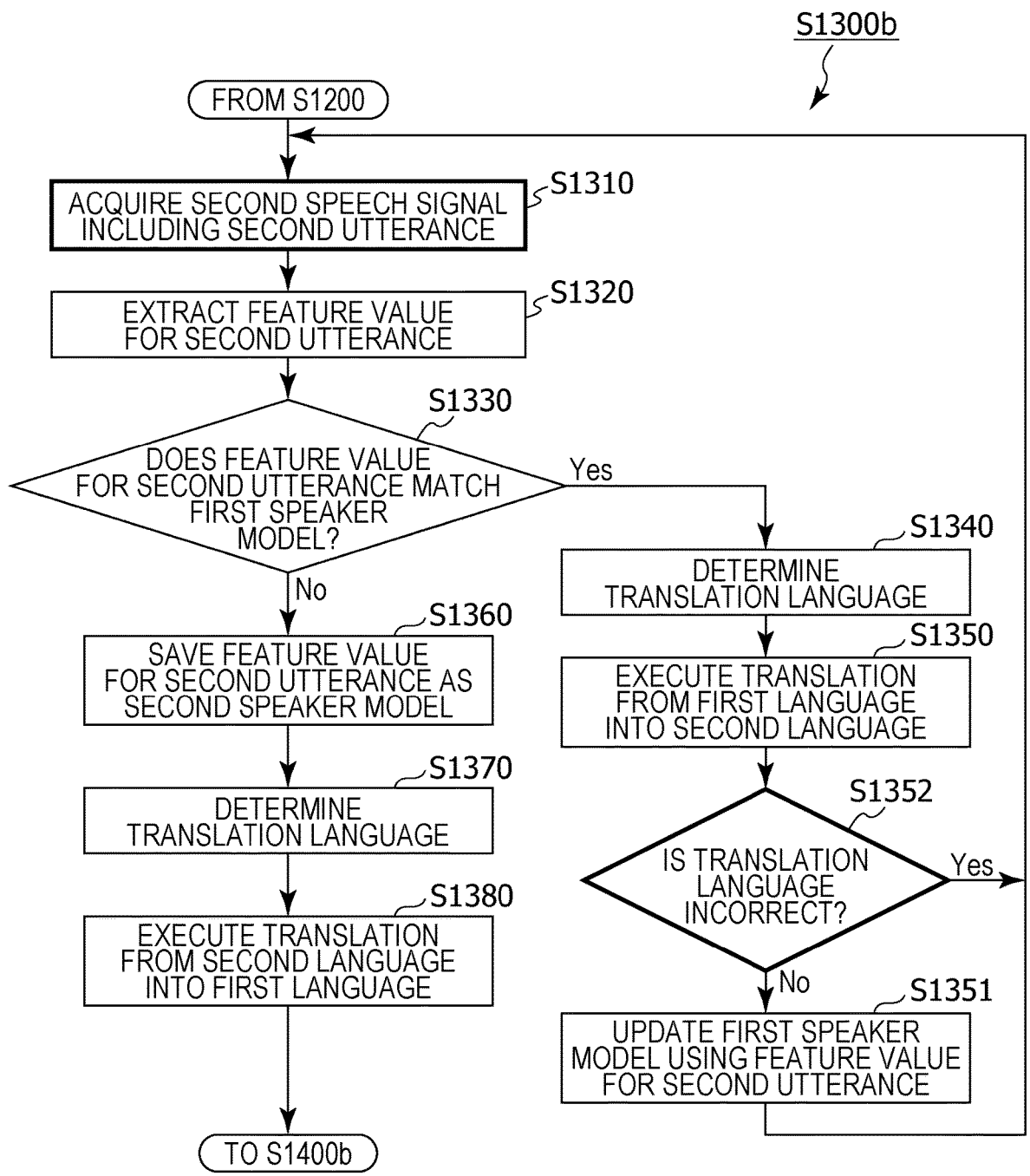
FIG. 10A is a flowchart depicting a detailed operation of model generation and translation processing in modified example 2 of embodiment 1.

FIG. 10A is a flowchart depicting a detailed operation of the model generation and translation processing in the present modified example.

The model generation and translation processing (step S1300*b*) in the present modified example corresponds to the model generation and translation processing (step S1300) in FIG. 5 and includes all of the steps of the flowchart depicted in FIG. 8A. In addition, the model generation and translation processing (step S1300*b*) in the present modified example includes processing in which the error determination unit 113 determines an error in the translation language (step S1352).

That is, the speaker recognition unit 104, when having determined in step S1330 that the feature value for the second utterance matches the first speaker model 111*a* ("yes" in step S1330), recognizes the speaker of the second utterance as being the first speaker. As a result, the language determination unit 105 determines the language of the second utterance as being the language associated with the first speaker in the language setting information (step S1340). For example, the language determination unit 105 determines the language of the second utterance as being the first language.

The speech recognition unit 106 then performs speech recognition in the first language on the second utterance included in the second speech signal, and generates text in the first language corresponding to the second utterance that has been subjected to speech recognition in the first language. The translation unit 107 translates the text in the first language corresponding to the second utterance into the second language. The speech synthesis unit 108 generates a synthesized speech signal that includes synthesized speech in the second language corresponding to the content of the text in the second language generated by the aforementioned translation, and outputs the synthesized speech signal to the reproduction unit 109. The loudspeaker corresponding to the reproduction unit 109 outputs the synthesized speech in the second language on the basis of the synthesized speech signal. Furthermore, the pre-translation text in the first language and the text in the second language obtained by translating the text in the first language into the second language are displayed by the display unit 110 (step S1350).

Here, in the present modified example, after step S1350, the error determination unit 113 determines whether or not the translation language is incorrect on the basis of a user operation (step S1352). Then, when it has been determined that the translation language is not incorrect ("no" in step S1352), the model update unit 112 updates the first speaker model 111*a* using the feature value for the second utterance (step S1351). However, when it is determined that the translation language is incorrect ("yes" in step S1352), the model update unit 112 does not update the first speaker model 111*a*.

In this way, in the present modified example, in a case where the content of the second utterance is translated from the first language into the second language, it is determined whether or not the translation language for the second utterance is incorrect, and, when it has been determined that the translation language for the content of the second utterance is not incorrect, the first speaker model 111*a* is updated using the second utterance.

Thus, the first speaker model 111*a* is updated in a case where the translation language for the content of the second utterance is not incorrect, and therefore it is possible to suppress the first speaker model 111*a* being updated inappropriately due to a translation in an incorrect language.

Figure 10B:
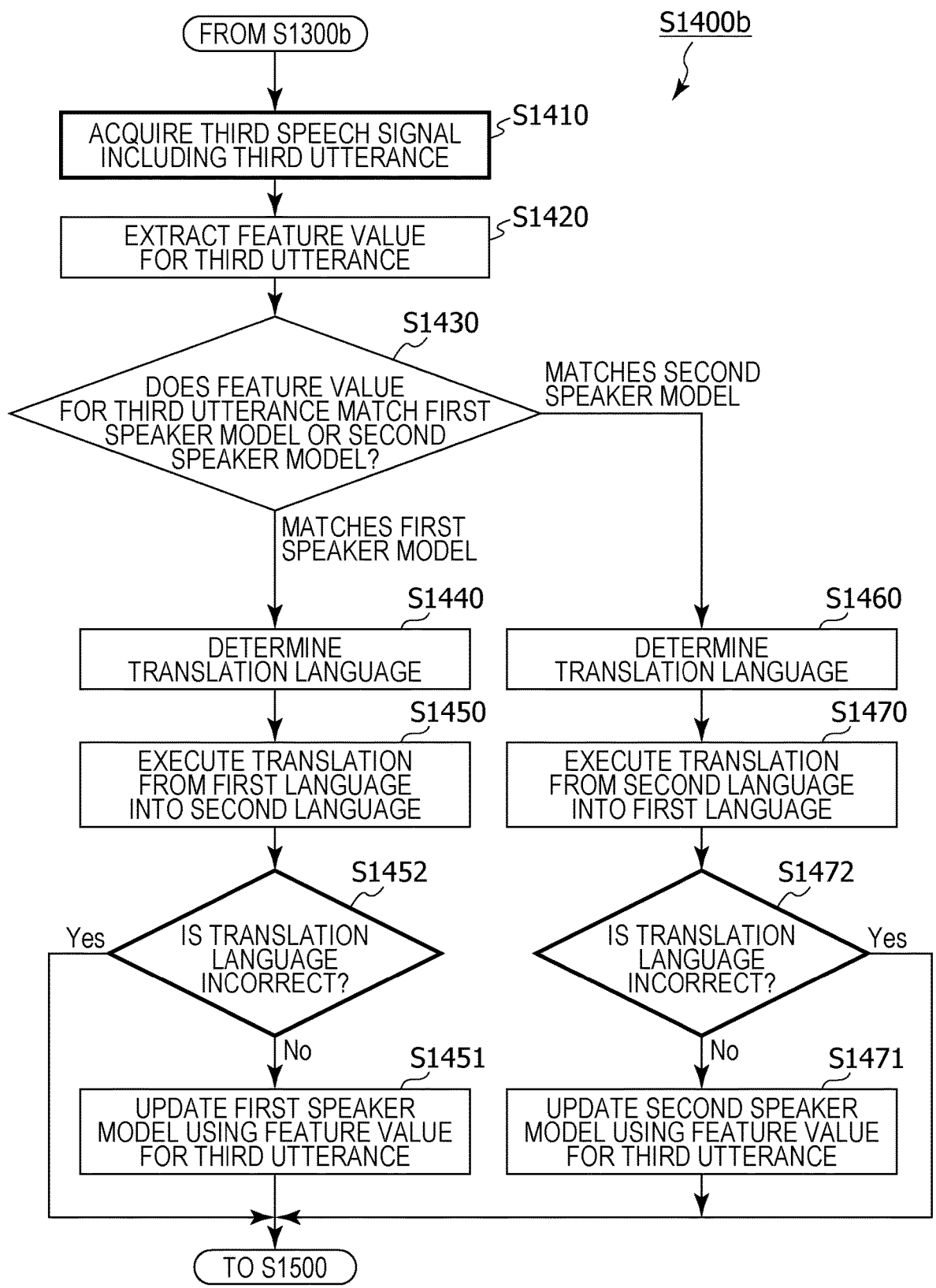
FIG. 10B is a flowchart depicting a detailed operation of the model generation and translation processing in modified example 2 of embodiment 1.

FIG. 10B is a flowchart depicting a detailed operation of the model generation and translation processing in the present modified example.

The regular translation processing (step S1400*b*) in the present modified example corresponds to the regular translation processing (step S1400) in FIG. 5 and includes all of the steps of the flowchart depicted in FIG. 8B. In addition, the regular translation processing (step S1400*b*) in the present modified example includes processing in which the error determination unit 113 determines an error in the translation language (steps S1452 and S1472).

That is, the speaker recognition unit 104, when having determined in step S1430 that the feature value for the third utterance matches the first speaker model 111*a*, recognizes the speaker of the third utterance as being the first speaker. As a result, the language determination unit 105 determines the language of the third utterance as being the language associated with the first speaker in the language setting information (step S1440). For example, the language determination unit 105 determines the language of the third utterance as being the first language.

The speech recognition unit 106 then performs speech recognition in the first language on the third utterance included in the third speech signal, and generates text in the first language corresponding to the third utterance that has been subjected to speech recognition in the first language. The translation unit 107 translates the text in the first language corresponding to the third utterance into the second language. The speech synthesis unit 108 generates a synthesized speech signal that includes synthesized speech in the second language corresponding to the content of the text in the second language generated by the aforementioned translation, and outputs the synthesized speech signal to the reproduction unit 109. The loudspeaker corresponding to the reproduction unit 109 outputs the synthesized speech in the second language on the basis of the synthesized speech signal. Furthermore, the pre-translation text in the first language and the text in the second language obtained by translating the text in the first language into the second language are displayed by the display unit 110 (step S1450).

Here, in the present modified example, after step S1450, the error determination unit 113 determines whether or not the translation language is incorrect on the basis of a user operation (step S1452). Then, when it has been determined that the translation language is not incorrect ("no" in step S1452), the model update unit 112 updates the first speaker model 111*a* using the feature value for the third utterance (step S1451). However, when it is determined that the translation language is incorrect ("yes" in step S1452), the model update unit 112 does not update the first speaker model 111*a*.

Furthermore, the speaker recognition unit 104, when having determined in step S1430 that the feature value for the third utterance matches the second speaker model 111*b*, recognizes the speaker of the third utterance as being the second speaker. As a result, the language determination unit 105 determines the language of the third utterance as being the language associated with the second speaker in the language setting information (step S1460). For example, the language determination unit 105 determines the language of the third utterance as being the second language.

The speech recognition unit 106 then performs speech recognition in the second language on the third utterance included in the third speech signal, and generates text in the second language corresponding to the third utterance that has been subjected to speech recognition in the second language. The translation unit 107 translates the text in the second language corresponding to the third utterance into the first language. The speech synthesis unit 108 generates a synthesized speech signal that includes synthesized speech in the first language corresponding to the content of the text in the first language obtained by the aforementioned translation, and outputs the synthesized speech signal to the reproduction unit 109. The loudspeaker corresponding to the reproduction unit 109 outputs the synthesized speech in the first language on the basis of the synthesized speech signal. Furthermore, the pre-translation text in the second language and the text in the first language obtained by translating the text in the second language into the first language are displayed by the display unit 110 (step S1470).

Here, in the present modified example, after step S1470, the error determination unit 113 determines whether or not the translation language is incorrect on the basis of a user operation (step S1472). Then, when it has been determined that the translation language is not incorrect ("no" in step S1472), the model update unit 112 updates the second speaker model 111*b* using the feature value for the third utterance (step S1471). However, when it is determined that the translation language is incorrect ("yes" in step S1452), the model update unit 112 does not update the second speaker model 111*b*.

In this way, in the present modified example, in a case where an utterance is translated, the translation device 100*b* determines whether or not the translation language for the utterance is incorrect. Then, when having determined that the translation language for the utterance is not incorrect, the translation device 100*b* updates, using the feature value for the utterance, a model that has already been generated and that corresponds to the speaker who has been recognized with respect to the utterance, out of the first speaker model 111*a* and the second speaker model 111*b*.

Thus, a model is updated in a case where the translation language for the utterance is not incorrect, and therefore it is possible to suppress a model being updated inappropriately due to a translation in an incorrect language.

Modified Example 3

The translation device in the present modified example has a configuration similar to that of the translation device 100*b* in modified example 2 but, when having determined that the translation language is incorrect, performs a reverse translation, and also, using an utterance, generates or updates a model corresponding to a speaker who is different from the speaker who has been recognized with respect to the utterance.

The overall processing operation in the translation device of the present modified example is the same as the operation depicted in FIG. 5 performed by the translation device 100 of embodiment 1. However, in the present modified example, the details of the model generation and translation processing (step S1300) and the details of the regular translation processing (step S1400) are different from those in embodiment 1.

Figure 11A:
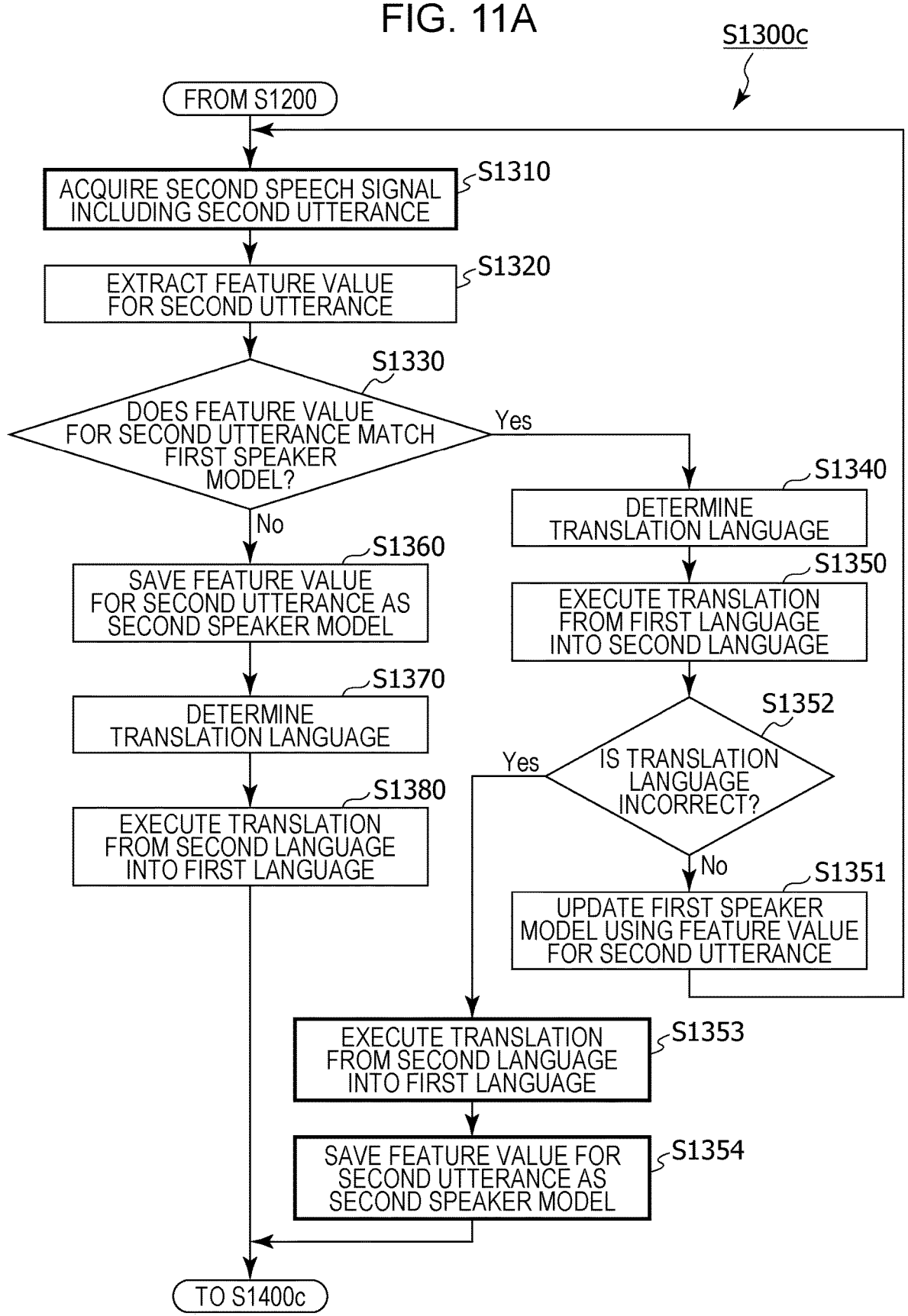
FIG. 11A is a flowchart depicting a detailed operation of model generation and translation processing in modified example 3 of embodiment 1.

FIG. 11A is a flowchart depicting a detailed operation of the model generation and translation processing in the present modified example.

The model generation and translation processing (step S1300*c*) in the present modified example corresponds to the model generation and translation processing (step S1300) in FIG. 5 and includes all of the steps of the flowchart depicted in FIG. 10A. In addition, the model generation and translation processing (step S1300*c*) in the present modified example includes processing for performing a reverse translation (step S1353) and processing for generating a model (step S1354).

That is, the speaker recognition unit 104, when having determined in step S1330 that the feature value for the second utterance matches the first speaker model 111*a* ("yes" in step S1330), recognizes the speaker of the second utterance as being the first speaker. As a result, the language determination unit 105 determines the language of the second utterance as being the language associated with the first speaker in the language setting information (step S1340). For example, the language determination unit 105 determines the language of the second utterance as being the first language.

The speech recognition unit 106 then performs speech recognition in the first language on the second utterance included in the second speech signal, and generates text in the first language corresponding to the second utterance that has been subjected to speech recognition in the first language. The translation unit 107 translates the text in the first language corresponding to the second utterance into the second language. The speech synthesis unit 108 generates a synthesized speech signal that includes synthesized speech in the second language corresponding to the content of the text in the second language generated by the aforementioned translation, and outputs the synthesized speech signal to the reproduction unit 109. The loudspeaker corresponding to the reproduction unit 109 outputs the synthesized speech in the second language on the basis of the synthesized speech signal. Furthermore, the pre-translation text in the first language and the text in the second language obtained by translating the text in the first language into the second language are displayed by the display unit 110 (step S1350). Here, after step S1350, the error determination unit 113 determines whether or not the translation language is incorrect on the basis of a user operation (step S1352). That is, the error determination unit 113 determines whether or not translation from the first language into the second language for the second utterance is incorrect, in other words, whether or not the recognition performed by the speaker recognition unit 104 is incorrect.

Here, in the present modified example, when it has been determined that the translation language is incorrect ("yes" in step S1352), the language determination unit 105 redetermines the language of the second utterance as being the second language which is not associated with the first speaker in the language setting information. As a result, the speech recognition unit 106, the translation unit 107, and the speech synthesis unit 108 perform a reverse translation.

In other words, the speech recognition unit 106 performs speech recognition in the second language on the second utterance included in the second speech signal, and generates text in the second language corresponding to the second utterance that has been subjected to speech recognition in the second language. The translation unit 107 translates the text in the second language corresponding to the second utterance into the first language. The speech synthesis unit 108 generates a synthesized speech signal that includes synthesized speech in the first language corresponding to the content of the text in the first language generated by the aforementioned translation, and outputs the synthesized speech signal to the reproduction unit 109. The loudspeaker corresponding to the reproduction unit 109 outputs the synthesized speech in the first language on the basis of the synthesized speech signal. Furthermore, the pre-translation text in the second language and the text in the first language obtained by translating the text in the second language into the first language are displayed by the display unit 110 (step S1353).

In addition, the speaker recognition unit 104 saves the feature value for the second utterance as the second speaker model 111*b* in the model storage unit 111 (step S1354). The second speaker model 111*b* is thereby generated.

However, when it is determined in step S1352 that the translation language is not incorrect ("no" in step S1352), similar to modified example 2, the model update unit 112 updates the first speaker model 111*a* using the feature value for the second utterance (step S1351).

In this way, in the present modified example, the translation device, when having determined that the translation language for the second utterance is incorrect, executes a reverse translation in which the translation source language and the translation target language in the translation of the second utterance are exchanged. In addition, the translation device generates the second speaker model 111*b*, which is a model of a feature value for an utterance of the second speaker, from the acquired second utterance.

Thus, in a case where the translation language for the second utterance is incorrect, a reverse translation is performed, and therefore it is possible to correct a translation of the second utterance that has been performed in an incorrect language. In addition, since the second speaker model 111*b* is generated, when an utterance is next acquired, a feature value for the utterance can be compared not only with the first speaker model 111*a* but also with the second speaker model 111*b*, and the speaker of the utterance can be recognized with a high degree of accuracy. As a result, it is possible to suppress the generation of a translation in an incorrect language.

Figure 11B:
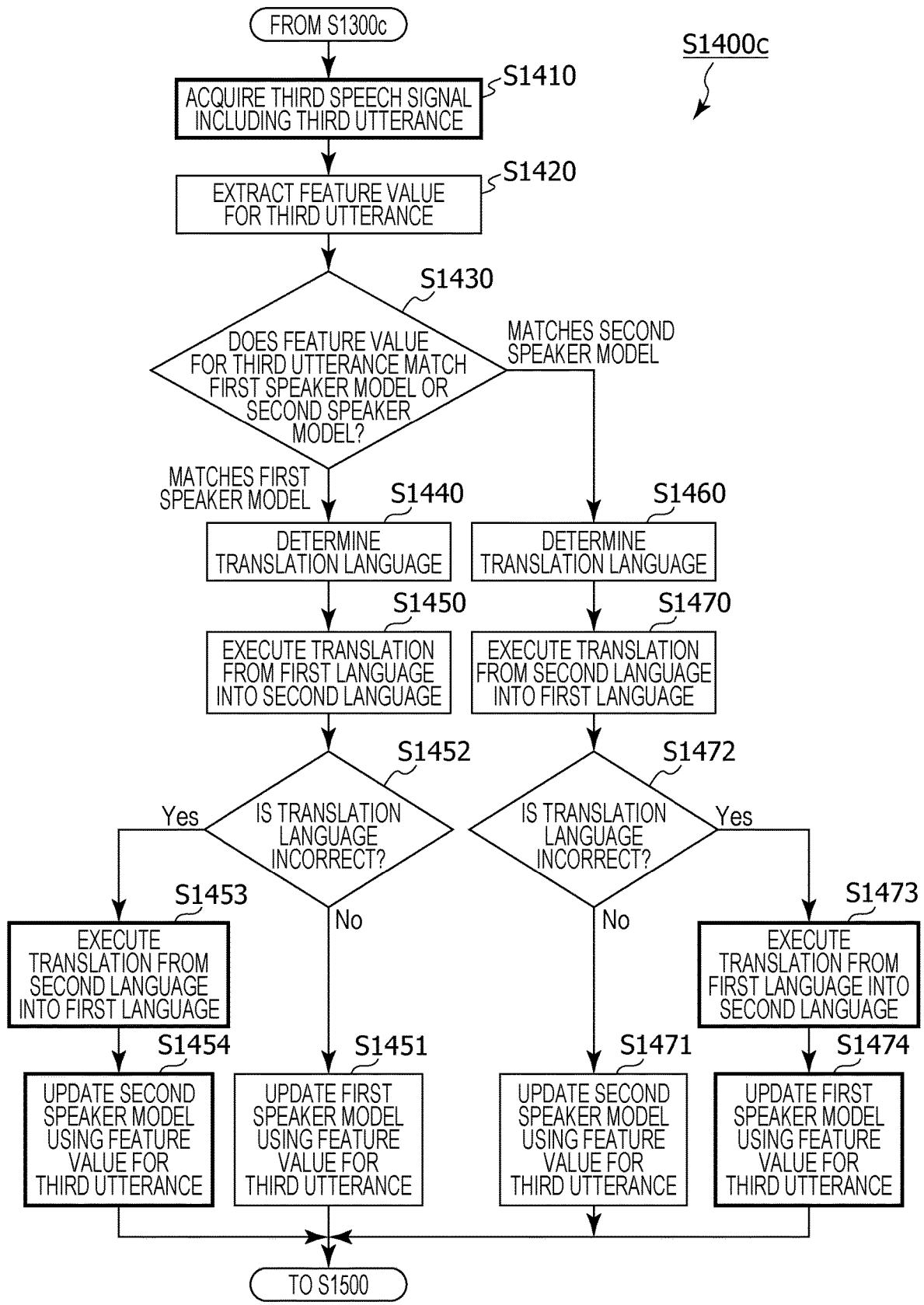
FIG. 11B is a flowchart depicting a detailed operation of the model generation and translation processing in modified example 3 of embodiment 1.

FIG. 11B is a flowchart depicting a detailed operation of the model generation and translation processing in the present modified example.

The regular translation processing (step S1400*c*) in the present modified example corresponds to the regular translation processing (step S1400) in FIG. 5 and includes all of the steps of the flowchart depicted in FIG. 10B. In addition, the regular translation processing (step S1400*c*) in the present modified example includes processing for performing a reverse translation (steps S1453 and S1473) and processing for generating a model (steps S1454 and S1474).

That is, the speaker recognition unit 104, when having determined in step S1430 that the feature value for the third utterance matches the first speaker model 111*a*, recognizes the speaker of the third utterance as being the first speaker. As a result, the language determination unit 105 determines the language of the third utterance as being the language associated with the first speaker in the language setting information (step S1440). For example, the language determination unit 105 determines the language of the third utterance as being the first language.

The speech recognition unit 106 then performs speech recognition in the first language on the third utterance included in the third speech signal, and generates text in the first language corresponding to the third utterance that has been subjected to speech recognition in the first language. The translation unit 107 translates the text in the first language corresponding to the third utterance into the second language. The speech synthesis unit 108 generates a synthesized speech signal that includes synthesized speech in the second language corresponding to the content of the text in the second language generated by the aforementioned translation, and outputs the synthesized speech signal to the reproduction unit 109. The loudspeaker corresponding to the reproduction unit 109 outputs the synthesized speech in the second language on the basis of the synthesized speech signal. Furthermore, the pre-translation text in the first language and the text in the second language obtained by translating the text in the first language into the second language are displayed by the display unit 110 (step S1450). Here, after step S1450, the error determination unit 113 determines whether or not the translation language is incorrect on the basis of a user operation (step S1452). That is, the error determination unit 113 determines whether or not translation from the first language into the second language for the third utterance is incorrect, in other words, whether or not the recognition performed by the speaker recognition unit 104 is incorrect.

Here, in the present modified example, when it has been determined that the translation language is incorrect ("yes" in step S1452), the language determination unit 105 redetermines the language of the third utterance as being the second language which is not associated with the first speaker in the language setting information. As a result, the speech recognition unit 106, the translation unit 107, and the speech synthesis unit 108 perform a reverse translation.

In other words, the speech recognition unit 106 performs speech recognition in the second language on the third utterance included in the third speech signal, and generates text in the second language corresponding to the third utterance that has been subjected to speech recognition in the second language. The translation unit 107 translates the text in the second language corresponding to the third utterance into the first language. The speech synthesis unit 108 generates a synthesized speech signal that includes synthesized speech in the first language corresponding to the content of the text in the first language generated by the aforementioned translation, and outputs the synthesized speech signal to the reproduction unit 109. The loudspeaker corresponding to the reproduction unit 109 outputs the synthesized speech in the first language on the basis of the synthesized speech signal. Furthermore, the pre-translation text in the second language and the text obtained by translating the text in the second language into the first language are displayed by the display unit 110 (step S1453).

In addition, the model update unit 112 updates the second speaker model 111*b* using the feature value for the third utterance (step S1454).

However, when it is determined in step S1452 that the translation language is not incorrect ("no" in step S1452), similar to modified example 2, the model update unit 112 updates the first speaker model 111*a* using the feature value for the third utterance (step S1451).

Furthermore, the speaker recognition unit 104, when having determined in step S1430 that the feature value for the third utterance matches the second speaker model 111*b*, recognizes the speaker of the third utterance as being the second speaker. As a result, the language determination unit 105 determines the language of the third utterance as being the language associated with the second speaker in the language setting information (step S1460). For example, the language determination unit 105 determines the language of the third utterance as being the second language.

The speech recognition unit 106 then performs speech recognition in the second language on the third utterance included in the third speech signal, and generates text in the second language corresponding to the third utterance that has been subjected to speech recognition in the second language. The translation unit 107 translates the text in the second language corresponding to the third utterance into the first language. The speech synthesis unit 108 generates a synthesized speech signal that includes synthesized speech in the first language corresponding to the content of the text in the first language generated by the aforementioned translation, and outputs the synthesized speech signal to the reproduction unit 109. The loudspeaker corresponding to the reproduction unit 109 outputs the synthesized speech in the first language on the basis of the synthesized speech signal. Furthermore, the pre-translation text in the second language and the text in the first language obtained by translating the text in the second language into the first language are displayed by the display unit 110 (step S1470). After step S1470, the error determination unit 113 determines whether or not the translation language is incorrect on the basis of a user operation (step S1472). That is, the error determination unit 113 determines whether or not translation from the second language into the first language for the third utterance is incorrect, in other words, whether or not the recognition performed by the speaker recognition unit 104 is incorrect.

Here, in the present modified example, when it has been determined that the translation language is incorrect ("yes" in step S1472), the language determination unit 105 redetermines the language of the third utterance as being the first language which is not associated with the second speaker in the language setting information. As a result, the speech recognition unit 106, the translation unit 107, and the speech synthesis unit 108 perform a reverse translation.

In other words, the speech recognition unit 106 performs speech recognition in the first language on the third utterance included in the third speech signal, and generates text in the first language corresponding to the third utterance that has been subjected to speech recognition in the first language. The translation unit 107 translates the text in the first language corresponding to the third utterance into the second language. The speech synthesis unit 108 generates a synthesized speech signal that includes synthesized speech in the second language corresponding to the content of the text in the second language generated by the aforementioned translation, and outputs the synthesized speech signal to the reproduction unit 109. The loudspeaker corresponding to the reproduction unit 109 outputs the synthesized speech in the second language on the basis of the synthesized speech signal. Furthermore, the pre-translation text in the first language and the text in the second language obtained by translating the text in the first language into the second language are displayed by the display unit 110 (step S1473).

In addition, the model update unit 112 updates the first speaker model 111*a* using the feature value for the third utterance (step S1474).

However, when it is determined in step S1472 that the translation language is not incorrect ("no" in step S1472), similar to modified example 2, the model update unit 112 updates the second speaker model 111*b* using the feature value for the third utterance (step S1471).

In this way, in the present modified example, the translation device, when having determined that the translation language is incorrect, executes a reverse translation in which the translation source language and the translation target language in the translation are exchanged. The translation device then generates or updates, using the feature value for the utterance, a model corresponding to a speaker who is different from the speaker who has been recognized with respect to the utterance, out of the first speaker model 111*a* and the second speaker model 111*b*.

Thus, in a case where the translation language for the utterance is incorrect, a reverse translation is performed, and therefore it is possible to correct a translation of the utterance that has been performed in an incorrect language. In addition, since the first speaker model 111*a* and the second speaker model 111*b* are generated or updated appropriately even in a case where the translation language has been incorrect, the speaker of an utterance acquired thereafter can be recognized with a high degree of accuracy. As a result, it is possible to suppress the generation of a translation in an incorrect language.

Modified Example 4

FIG. 12 is a block diagram depicting the configuration of a translation device in modified example 4 of embodiment 1.

A translation device 100*d* in the present modified example is provided with an utterance length determination unit 114 in addition to the constituent elements of the translation device 100 in embodiment 1. For example, the utterance length determination unit 114 may function by means of a program that realizes the function of the utterance length determination unit 114 being stored in a memory of the translation device 100*d* and a processor of the translation device 100*d* executing the program. Alternatively, the translation device 100*d* may be provided with a processing circuit that realizes the function of the utterance length determination unit 114.

The utterance length determination unit 114 determines whether or not the time length of an utterance acquired by the sound pickup unit 101 is greater than or equal to a threshold value. The threshold value is a time length during which one word is spoken, for example, and is 0.3 to 0.4 seconds, to be specific. It should be noted that the threshold value is not restricted to 0.3 to 0.4 seconds, and may be less than 0.3 seconds or longer than 0.4 seconds.

The feature value extraction unit 103 in the present modified example extracts feature values for utterances having a time length that is greater than or equal to the threshold value, and does not extract feature values for utterances having a time length that is less than the threshold value, from among utterances included in speech signals acquired by the sound pickup unit 101.

The translation device 100d in the present modified example operates in accordance with the flowchart depicted in FIG. 5, similar to embodiment 1.

Figure 13A:
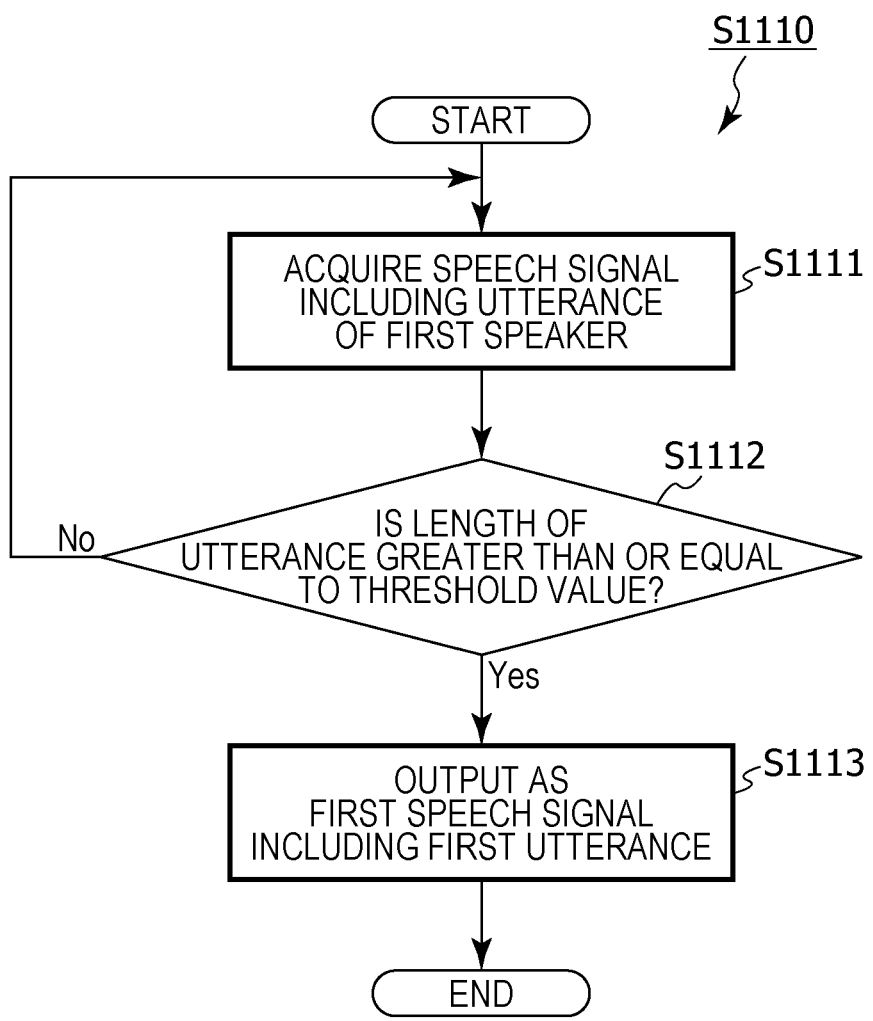
FIG. 13A is a flowchart depicting details of processing for acquiring a first utterance in setting processing in modified example 4 of embodiment 1.

FIG. 13A is a flowchart depicting details of processing for acquiring a first speech signal corresponding to a speech signal that includes a first utterance (step S1110) in setting processing (step S1100) of the present modified example.

First, the sound pickup unit 101 acquires a speech signal by picking up an utterance of the first speaker and converting the utterance into an electrical signal (step S1111). Next, the utterance length determination unit 114 determines whether or not the time length of the utterance included in the speech signal is greater than or equal to the threshold value (step S1112). Here, when it is determined that the time length of the utterance is greater than or equal to the threshold value ("yes" in step S1112), the utterance length determination unit 114 outputs the speech signal including the utterance to the feature value extraction unit 103 as a first speech signal that corresponds to a speech signal including a first utterance (step S1113).

FIG. 13B is a flowchart depicting details of processing for acquiring a second speech signal corresponding to a speech signal that includes a second utterance (step S1310) in model generation and translation processing (step S1300) of the present modified example.

First, the sound pickup unit 101 acquires a speech signal by picking up an utterance from after the start of a conversation and converting the utterance into an electrical signal (step S1311). Next, the utterance length determination unit 114 determines whether or not the time length of the utterance included in the speech signal is greater than or equal to the threshold value (step S1312). Here, when it is determined that the time length of the utterance is greater than or equal to the threshold value ("yes" in step S1312), the utterance length determination unit 114 outputs the speech signal including the utterance to the feature value extraction unit 103 as a second speech signal that corresponds to a speech signal including a second utterance (step S1313).

FIG. 13C is a flowchart depicting details of processing for acquiring a third speech signal corresponding to a speech signal that includes a third utterance (step S1410) in regular translation processing (step S1400) of the present modified example.

First, the sound pickup unit 101 acquires a speech signal that includes an utterance from after the first speaker model 111a and the second speaker model 111b have been generated (step S1411). Next, the utterance length determination unit 114 determines whether or not the time length of the utterance is greater than or equal to the threshold value (step S1412). Here, when it is determined that the time length of the utterance is greater than or equal to the threshold value ("yes" in step S1412), the utterance length determination unit 114 outputs the speech signal including the utterance to the feature value extraction unit 103 as a third speech signal that corresponds to a speech signal including a third utterance (step S1413).

In this way, in the present modified example, in the acquisition of a speech signal that includes a first utterance, the acquisition of a speech signal that includes a second utterance, and the acquisition of a speech signal that includes a third utterance, it is determined whether or not the time length of an utterance of the first speaker or the second speaker is greater than or equal to the threshold value, and a speech signal that includes an utterance having a time length that is determined as being greater than or equal to the threshold value is acquired as the first speech signal, the second speech signal, or the third speech signal. It is thereby possible to suppress an utterance that does not make sense being translated inappropriately, for example, and it is possible for a conversation that involves translation to be carried out smoothly.

Modified Example 5

FIG. 14 is a block diagram depicting the configuration of a translation device in modified example 5 of embodiment 1.

For example, in the aforementioned embodiment and modified examples, a configuration was adopted in which a signal corresponding to a sound picked up by the sound pickup unit 101 is treated as a speech signal and output to the feature value extraction unit 103 as it is. However, there are cases where noise is included in the signal picked up by the sound pickup unit 101. The present modified example is characterized in that a signal picked up by the sound pickup unit 101 has noise removed therefrom and is then output to the feature value extraction unit 103.

A translation device 100e in the present modified example is provided with a noise determination unit 115 in addition to the constituent elements of the translation device 100 in embodiment 1. For example, the noise determination unit 115 may function by means of a program that realizes the function of the noise determination unit 115 being stored in a memory of the translation device 100e and a processor of the translation device 100e executing the program. Alternatively, the translation device 100e may be provided with a processing circuit that realizes the function of the noise determination unit 115. The noise determination unit 115 may be included in the sound pickup unit 101.

The sound pickup unit 101 outputs a signal corresponding to a picked up sound to the noise determination unit 115. This signal corresponding to a picked up sound will be described being referred to as a sound signal. There are cases where a picked up sound includes noise in addition to a sound corresponding to an utterance, for example. Consequently, in the sound pickup unit 101, there are cases where a picked up sound signal includes a sound signal corresponding to noise in addition to a sound signal corresponding to an utterance.

The noise determination unit 115 determines whether or not a sound picked up by the sound pickup unit 101 is speech, namely an utterance. In other words, the noise determination unit 115 determines whether the sound is an utterance or noise. For example, the noise determination unit 115 determines whether a sound is an utterance or noise on the basis of the length and power of the sound, sound discrimination, or the like. Specifically, the noise determination unit 115 determines noise as being a sound having a time length that is less than a threshold value or a sound having a power (sound pressure, in other words) that is greater than or equal to a threshold value, and determines an utterance as being a sound having a time length that exceeds the threshold value or a sound having a power that is less than the threshold value. Furthermore, the noise determination unit 115 may determine whether a sound is noise or an utterance on the basis of the frequency of the sound.

Then, when having determined that a sound is noise, the noise determination unit 115 prohibits the output of the sound signal corresponding to the sound, namely the noise, to the feature value extraction unit 103. However, when having determined that a sound is an utterance, the noise determination unit 115 outputs the sound signal corresponding to the sound, namely the utterance, as a speech signal to the feature value extraction unit 103. That is, a sound signal obtained by removing a sound signal corresponding to noise included in an acquired sound signal is output as a speech signal to the feature value extraction unit 103.

The translation device 100e in the present modified example operates in accordance with the flowchart depicted in FIG. 5, similar to embodiment 1.

FIG. 15A is a flowchart depicting details of processing for acquiring a first utterance (step S1110) in setting processing (step S1100) of the present modified example.

First, the sound pickup unit 101 acquires a sound signal by picking up a sound from before the start of a conversation and converting the sound into an electrical signal (step S1115). Next, the noise determination unit 115 determines whether or not the sound included in the sound signal is an utterance (step S1116). Here, when having determined that the sound is an utterance ("yes" in step S1116), the noise determination unit 115 outputs the sound, namely a sound signal corresponding to a first utterance, to the feature value extraction unit 103 as a first speech signal that corresponds to a speech signal including a first utterance (step S1117). However, when having determined that the sound is not an utterance, namely noise ("no" in step S1116), the noise determination unit 115 prohibits the output of the sound signal corresponding to the sound, namely the noise, to the feature value extraction unit 103. That is, a sound signal obtained by extracting a speech signal corresponding to the first utterance from a sound signal acquired before the start of a conversation, or a sound signal obtained by removing a sound signal corresponding to noise from the sound signal acquired before the start of the conversation, is output to the feature value extraction unit 103 as the first speech signal.

FIG. 15B is a flowchart depicting details of processing for acquiring a second utterance (step S1310) in model generation and translation processing (step S1300) of the present modified example.

First, the sound pickup unit 101 acquires a sound signal by picking up a sound from after the start of a conversation and converting the sound into an electrical signal (step S1315). Next, the noise determination unit 115 determines whether or not the sound included in the sound signal is an utterance (step S1316). Here, when having determined that the sound is an utterance ("yes" in step S1316), the noise determination unit 115 outputs the sound, namely a sound signal corresponding to a second utterance, to the feature value extraction unit 103 as a second speech signal that corresponds to a speech signal including a second utterance (step S1317). However, when having determined that the sound is not an utterance, namely noise ("no" in step S1316), the noise determination unit 115 prohibits the output of the sound signal corresponding to the sound, namely the noise, to the feature value extraction unit 103. That is, a sound signal obtained by extracting a speech signal corresponding to the second utterance from a sound signal acquired after the start of a conversation, or a sound signal obtained by removing a sound signal corresponding to noise from the acquired sound signal, is output to the feature value extraction unit 103 as the second speech signal.

Figure 15C:
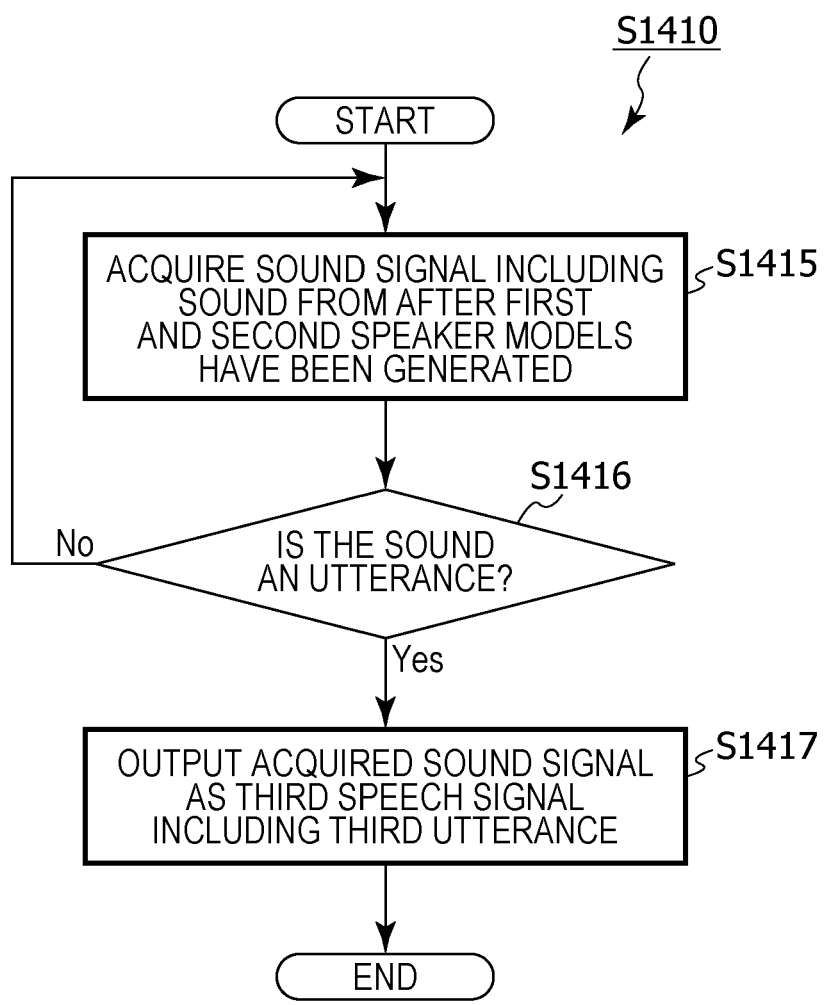
FIG. 15C is a flowchart depicting details of processing for acquiring a third utterance in regular translation processing in modified example 5 of embodiment 1.

FIG. 15C is a flowchart depicting details of processing for acquiring a third utterance (step S1410) in regular translation processing (step S1400) of the present modified example.

First, the sound pickup unit 101 acquires a sound signal by picking up a sound from after the first speaker model 111a and the second speaker model 111b have been generated and converting the sound into an electrical signal (step S1415). Next, the noise determination unit 115 determines whether or not the sound included in the acquired sound signal is an utterance (step S1416). Here, when having determined that the sound is an utterance ("yes" in step S1416), the noise determination unit 115 outputs the sound, namely a sound signal corresponding to a third utterance, to the feature value extraction unit 103 as a third speech signal that corresponds to a speech signal including a third utterance (step S1417). However, when having determined that the sound is not an utterance, namely noise ("no" in step S1416), the noise determination unit 115 prohibits the output of the sound signal corresponding to the sound, namely the noise, to the feature value extraction unit 103. That is, a sound signal obtained by extracting a speech signal corresponding to the third utterance from a sound signal acquired after the first speaker model 111a and the second speaker model 111b have been generated, or a sound signal obtained by removing a sound signal corresponding to noise from the acquired sound signal, is output to the feature value extraction unit 103 as the third speech signal.

In this way, in the present modified example, in the acquisition of a first speech signal that includes a first utterance, the acquisition of a second speech signal that includes a second utterance, and the acquisition of a third speech signal that includes a third utterance, it is determined whether or not a sound included in a sound signal is an utterance of the first speaker or the second speaker, and a sound that has been determined as being an utterance is acquired as a first speech signal that corresponds to a speech signal including a first utterance, a second speech signal that corresponds to a speech signal including a second utterance, or a third speech signal that corresponds to a speech signal including a third utterance. Thus, for example, it is possible to suppress ambient noise of the first speaker or the second speaker being treated as an utterance and being translated inappropriately, and it is possible for a conversation that involves translation to be carried out smoothly.

Modified Example 6

Figure 16:
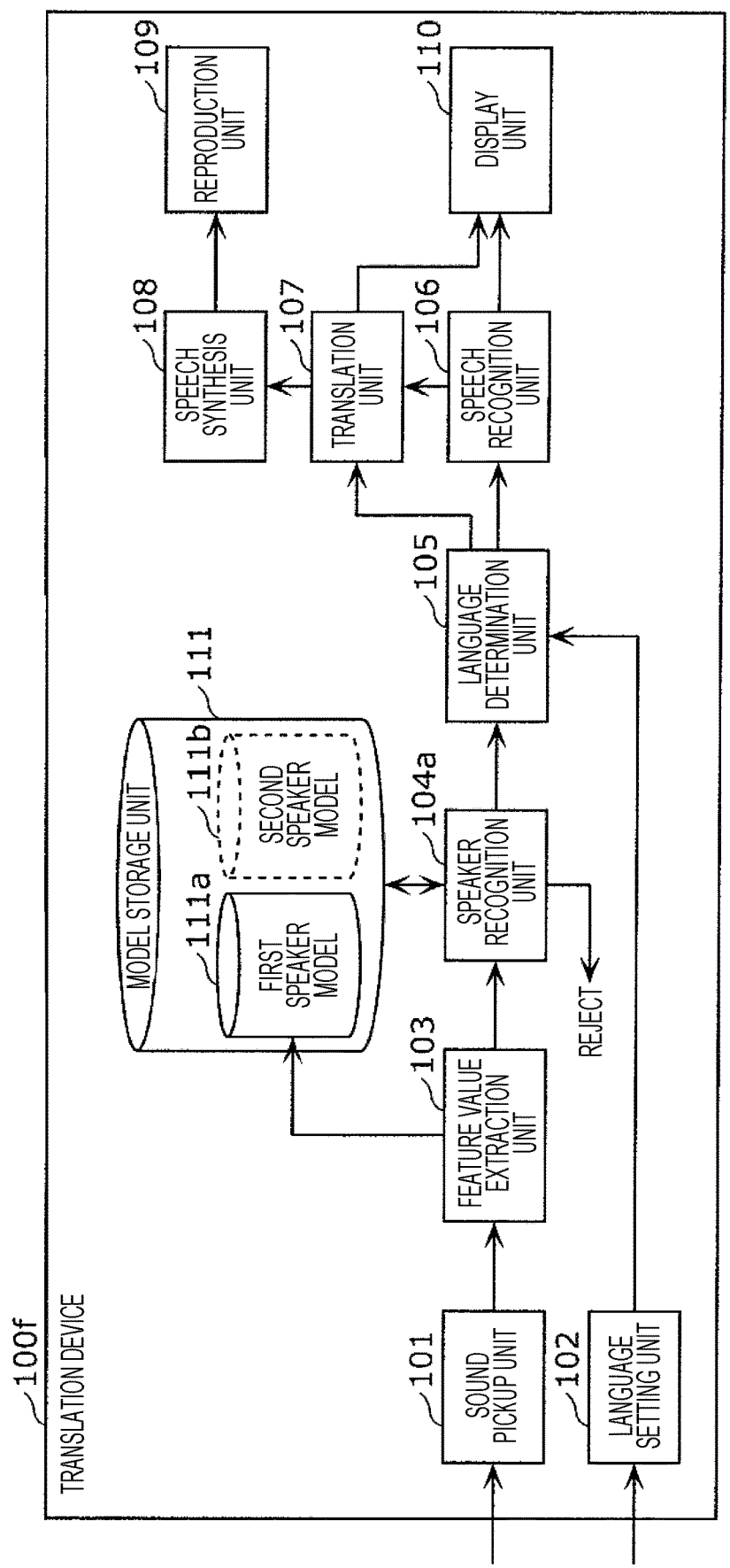
FIG. 16 is a block diagram depicting the configuration of the translation device in modified example 6 of embodiment 1.

FIG. 16 is a block diagram depicting the configuration of a translation device in modified example 6 of embodiment 1.

A translation device 100f in the present modified example is provided with a speaker recognition unit 104a instead of the speaker recognition unit 104 of the translation device 100 in embodiment 1. For example, the speaker recognition unit 104a may function by means of a program that realizes the function of the speaker recognition unit 104a being stored in a memory of the translation device 100f and a processor of the translation device 100f executing the program. Alternatively, the translation device 100f may be provided with a processing circuit that realizes the function of the speaker recognition unit 104a.

In a case where the feature value for the third utterance extracted by the feature value extraction unit 103 does not match the first speaker model 111a and does not match the second speaker model 111b, the speaker recognition unit 104a rejects the third utterance.

The overall processing operation in the translation device 100f of the present modified example is the same as the operation depicted in FIG. 5 performed by the translation device 100 of embodiment 1. However, in the present modified example, the details of the regular translation processing (step S1400) are different from embodiment 1.

Figure 17:
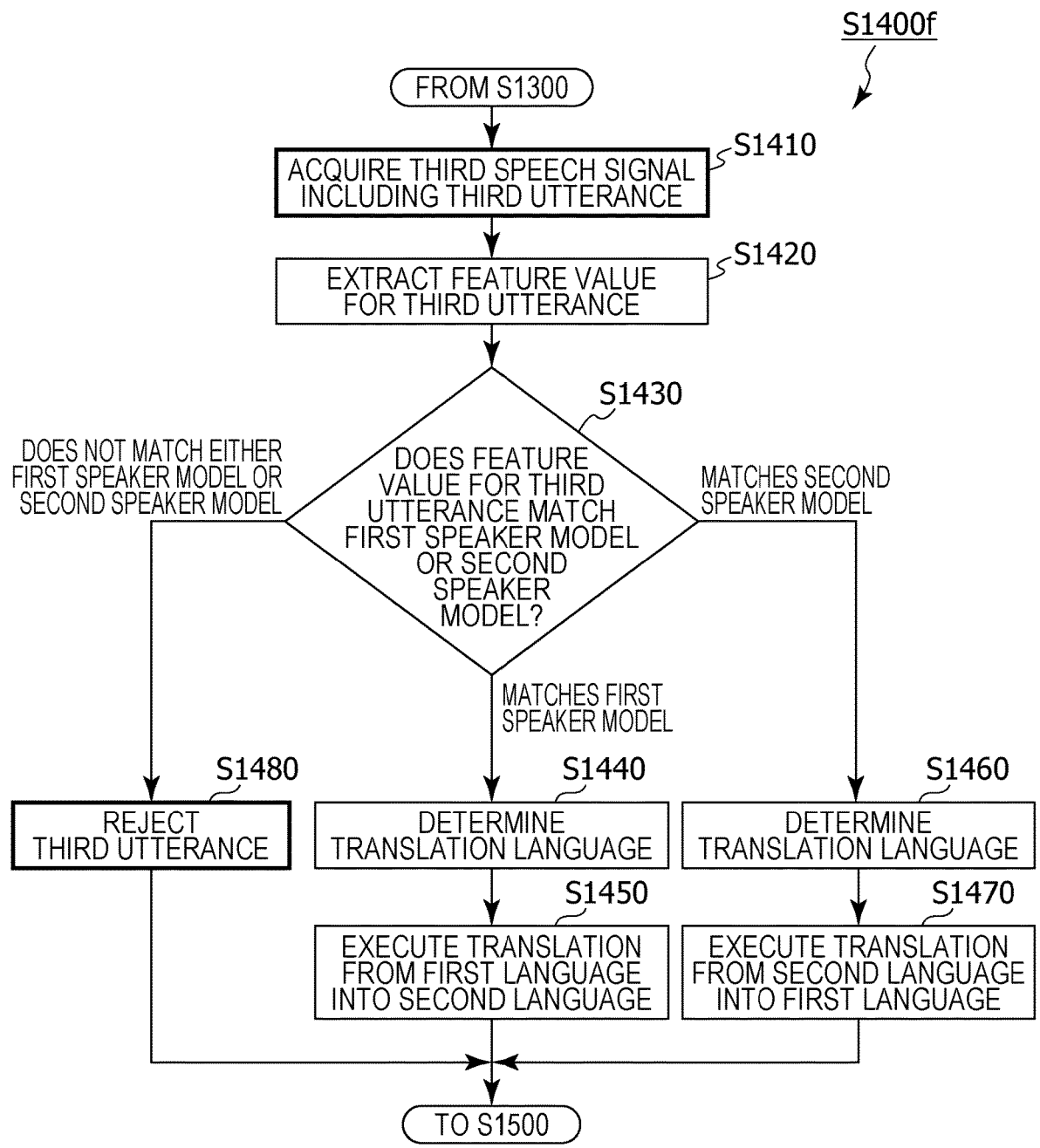
FIG. 17 is a flowchart depicting a detailed operation of regular translation processing in modified example 6 of embodiment 1.

FIG. 17 is a flowchart depicting a detailed operation of the regular translation processing (step S1400f) in the present modified example.

The regular translation processing (step S1400f) in the present modified example corresponds to the regular translation processing (step S1400) in FIG. 5 and includes all of the steps of the flowchart depicted in FIG. 6C. In addition, the regular translation processing (step S1400f) in the present modified example includes processing for rejecting the third utterance (step S1480).

In other words, in the present modified example, in step S1430, when the feature value for the third utterance does not match the first speaker model 111a and does not match the second speaker model 111b, the speaker recognition unit 104a rejects the third utterance (step S1480). It is thereby possible to prevent the translation of a third utterance that is estimated as being an utterance from a speaker who is not the first speaker or the second speaker.

In this way, in the present modified example, the translation device 100f compares the feature value for the third utterance and each of the first speaker model 111a and the second speaker model 111b, and, in a case where it is thereby recognized that the speaker of the third utterance is not the first speaker or the second speaker, rejects the third utterance, and therefore does not translate the third utterance.

Thus, it is possible to suppress an utterance of a third speaker who is not the first speaker or the second speaker being translated. That is, it is possible to suppress a conversation that involves translation between a first speaker and a second speaker being disturbed by an utterance of a third speaker, and it is possible for the conversation to be carried out smoothly.

Embodiment 2

The translation device in the present embodiment generates the first speaker model 111a and the second speaker model 111b after the start of a conversation, rather than generating the first speaker model 111a before the start of a conversation as in embodiment 1. Therefore, in the translation device in the present embodiment, out of the first speaker and the second speaker, the speaker who is to initially speak in a conversation is set before the start of a conversation.

Figure 18:
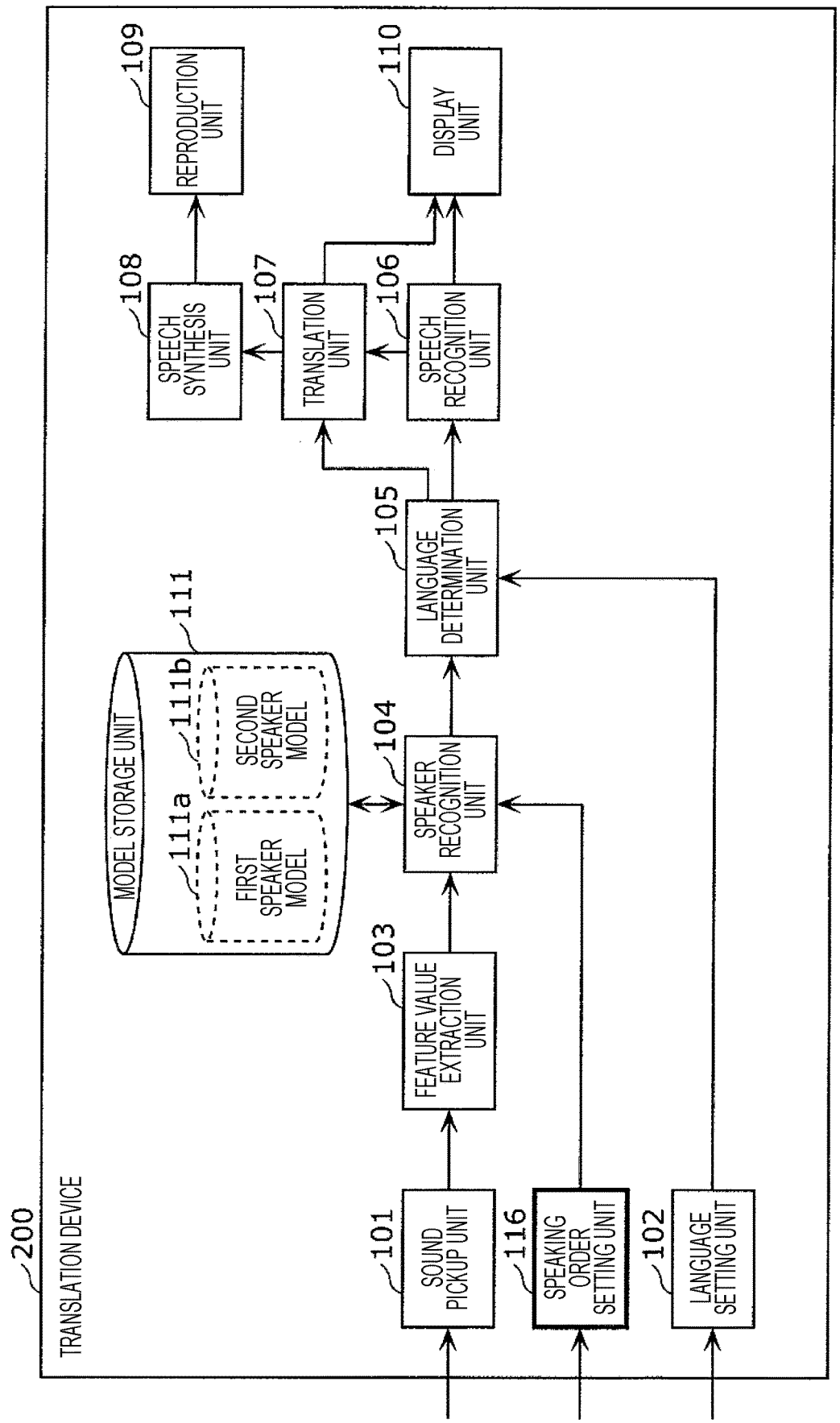
FIG. 18 is a block diagram depicting the configuration of a translation device in embodiment 2.

FIG. 18 is a block diagram depicting the configuration of a translation device 200 in the present embodiment.

The translation device 200 in the present embodiment, similar to embodiment 1, is provided with the sound pickup unit 101, the language setting unit 102, the feature value extraction unit 103, the speaker recognition unit 104, the language determination unit 105, the speech recognition unit 106, the translation unit 107, the speech synthesis unit 108, the reproduction unit 109, the display unit 110, and the model storage unit 111. In addition, the translation device 200 in the present embodiment is provided with a speaking order setting unit 116. It should be noted that, in the present embodiment, constituent elements that are the same as those of the translation device in embodiment 1 are denoted by the same reference numbers as in embodiment 1, and detailed descriptions of those constituent elements have been omitted.

The speaking order setting unit 116 generates speaking order information that indicates the speaker who is to initially speak in a conversation out of a first speaker and a second speaker who are to carry out the conversation, and sets the speaking order information in a memory (not depicted) of the translation device 200. In the present embodiment, information indicating the first speaker, for example, as the speaker who is to initially speak is set in the memory as the speaking order information. The speaking order setting unit 116 outputs the speaking order information that has been set in the memory to the speaker recognition unit 104, for example.

Figure 19:
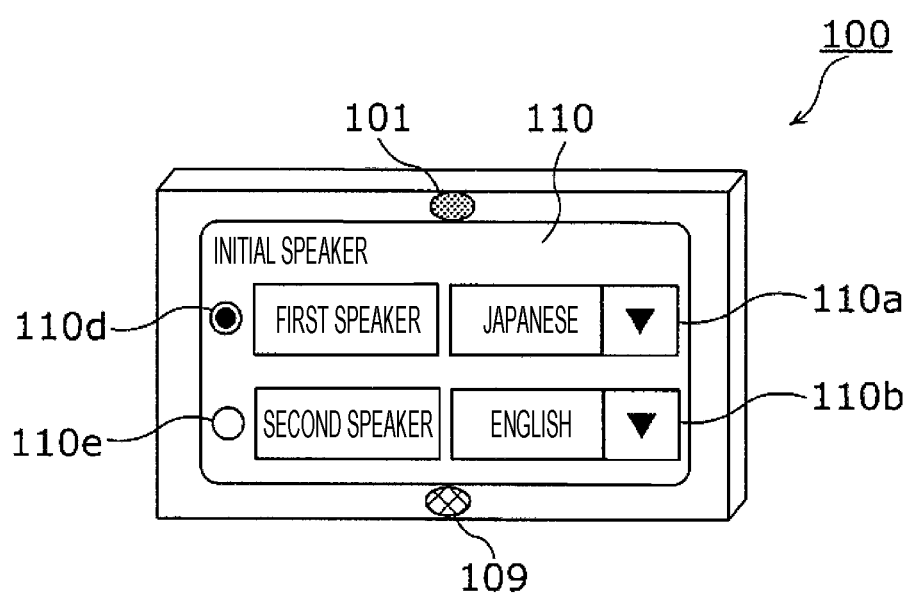
FIG. 19 is a drawing depicting an example of a language setting screen of the translation device in embodiment 2.

FIG. 19 is a drawing depicting an example of a language setting screen of the translation device 200.

The translation device 200 displays the language setting screen on the display unit 110 before a conversation is started. Similar to the language setting screen depicted in FIG. 2A in embodiment 1, this language setting screen includes the first language setting field 110a for setting the language spoken by the first speaker, and the second language setting field 110b for setting the language spoken by the second speaker. In addition, the language setting screen in the present embodiment includes radio buttons 110d and 110e for setting the speaker who is to initially speak in the conversation. For example, the user of the translation device 200, by operating the translation device 200, inputs a check to the radio button 110d for setting the first speaker as the speaker who is to initially speak. Due to this check, the first speaker is set as the speaker who is to initially speak. That is, the speaking order setting unit 116 generates speaking order information indicating the first speaker who has been set as the speaker who is to initially speak in the conversation. The speaking order setting unit 116 then outputs the speaking order information to the speaker recognition unit 104. In the present embodiment, speaking order information indicating the first speaker who has been set as the speaker who is to initially speak in a conversation is generated; however, it should be noted that speaking order information indicating the second speaker is generated in a case where the second speaker has been set as the speaker who is to initially speak.

The speaker recognition unit 104 recognizes the speaker of the utterance that is initially acquired after the start of the conversation, on the basis of the speaking order information. In this example, the speaker recognition unit 104 recognizes the speaker of the utterance that is initially acquired after the start of the conversation, as the first speaker. The speaker recognition unit 104 then stores a feature value extracted from the utterance by the feature value extraction unit 103 in the model storage unit 111 as the first speaker model 111a. The first speaker model 111a is thereby generated.

The language determination unit 105 determines the language of the speaker recognized by the speaker recognition unit 104, on the basis of the language setting information. That is, as mentioned above, when the speaker of the initial utterance in the conversation is recognized as the first speaker, the language determination unit 105 determines the first language associated with the first speaker in the language setting information as being the language of the initial utterance.

As a result, the speech recognition unit 106 performs speech recognition in the first language on the initial utterance included in a speech signal corresponding to a first speech signal, and generates text in the first language corresponding to the initial utterance that has been subjected to speech recognition in the first language. The translation unit 107 translates the text in the first language corresponding to the initial utterance into the second language. The speech synthesis unit 108 generates a synthesized speech signal that includes synthesized speech in the second language corresponding to the content of the text in the second language generated by the aforementioned translation, and outputs the synthesized speech signal to the reproduction unit 109. The loudspeaker corresponding to the reproduction unit 109 outputs the synthesized speech in the second language on the basis of the synthesized speech signal. Furthermore, the pre-translation text in the first language and the text in the second language obtained by translating the text in the first language into the second language are displayed by the display unit 110.

The overall processing operation in the translation device 200 of the present embodiment is the same as the operation depicted in FIG. 5 performed by the translation device 100 of embodiment 1. However, in the present embodiment, the details of the setting processing (step S1100) and the details of the model generation and translation processing (step S1300) are different from those in embodiment 1.

Figure 20A:
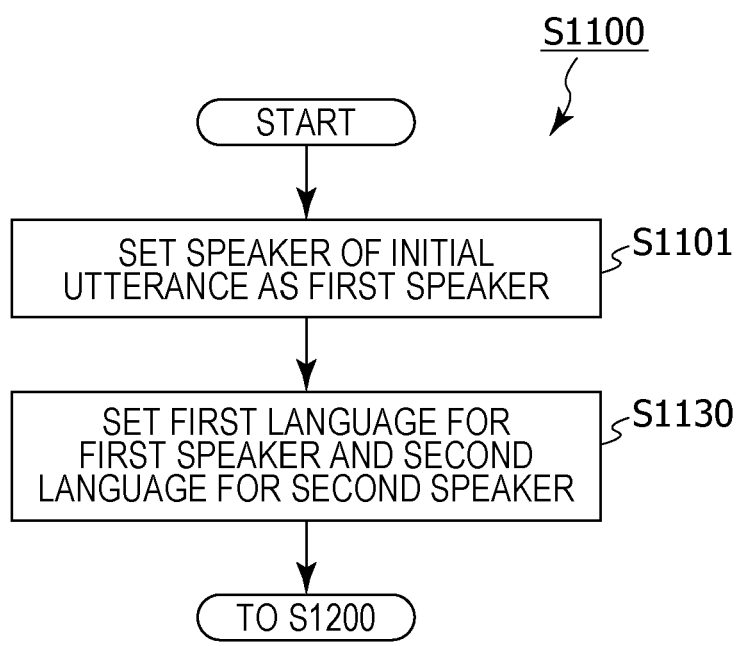
FIG. 20A is a flowchart depicting a detailed operation of setting processing in embodiment 2.

FIG. 20A is a flowchart depicting a detailed operation of the setting processing (step S1100) in the present embodiment.

First, the speaking order setting unit 116 sets the first speaker as the speaker who is to initially speak in the conversation out of the first speaker and the second speaker, in accordance with a user operation of the translation device 200 (step S1101). The speaking order setting unit 116 then outputs the speaking order information indicating that the initial speaker is the first speaker to the speaker recognition unit 104.

Next, the language setting unit 102 sets the first language with respect to the first speaker and sets the second language with respect to the second speaker in accordance with a user operation of the translation device 200 (step S1130).

In this way, the translation device 200 in the present embodiment sets, in the memory, language setting information that indicates the first language and the second language respectively as the language spoken by the first speaker and the language spoken by the second speaker, and also sets, in the memory, speaking order information that indicates the first speaker who has been set as the speaker who is to initially speak in the conversation.

Figure 20B:
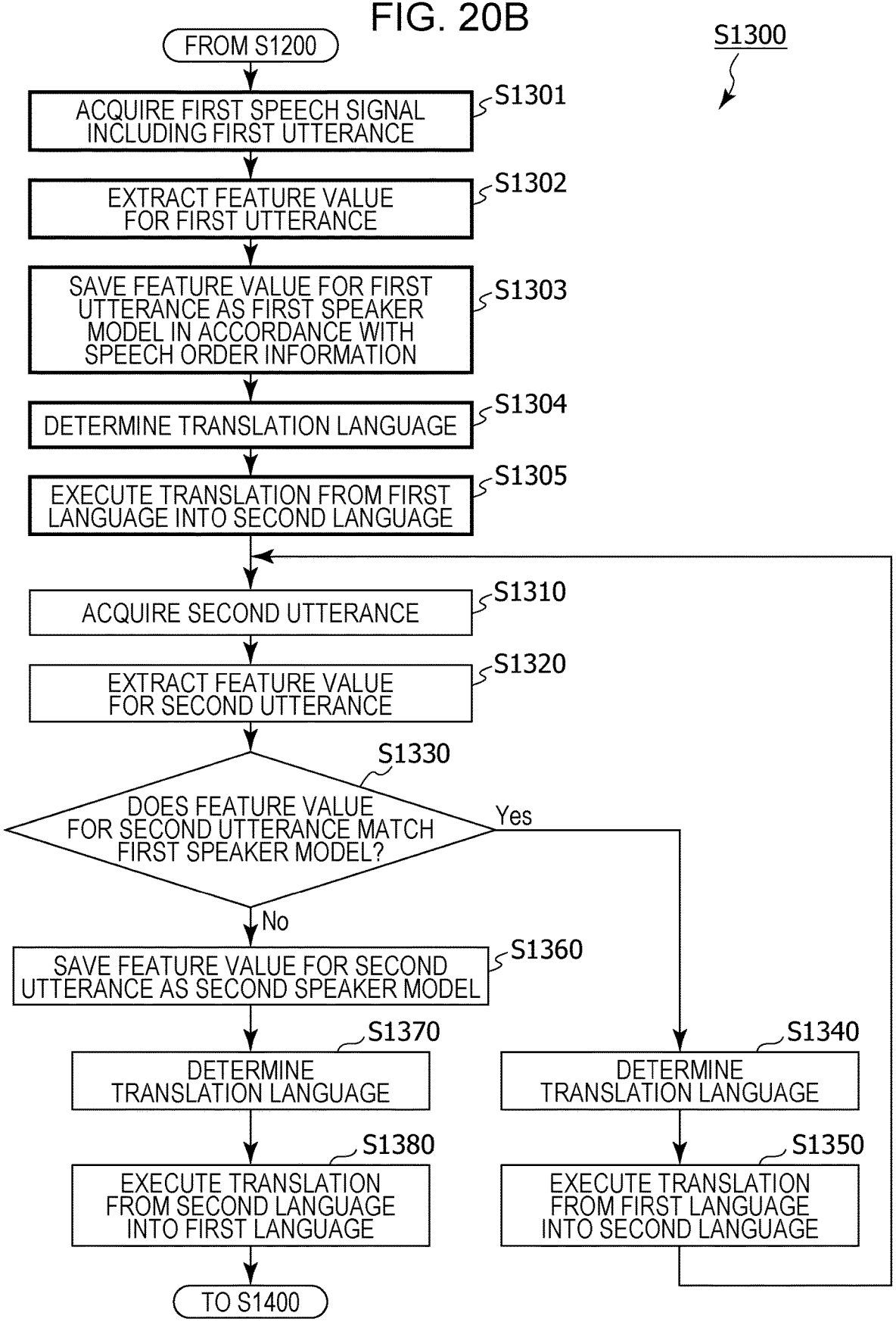
FIG. 20B is a flowchart depicting a detailed operation of model generation and translation processing in embodiment 2.

FIG. 20B is a flowchart depicting a detailed operation of the model generation and translation processing (step S1300) in the present embodiment.

The model generation and translation processing in the present embodiment includes the steps of the model generation and translation processing depicted in FIG. 6B of embodiment 1, and additionally includes steps S1301 to S1305.

First, the sound pickup unit 101 of the translation device 200 acquires a first speech signal corresponding to a speech signal that includes a first utterance constituting the initial utterance from after the start of the conversation (step S1301).

Next, the feature value extraction unit 103 extracts a feature value for the first utterance included in the acquired speech signal (step S1302).

The speaker recognition unit 104 then recognizes the first speaker as the speaker of the first utterance on the basis of the speaking order information that has been output from the speaking order setting unit 116, and saves a feature value for the first utterance in the model storage unit 111 as the first speaker model 111a corresponding to the first speaker (step S1303). The first speaker model 111a is thereby generated.

Next, the language determination unit 105 determines the first language associated with the first speaker in the language setting information as being the language of the first utterance (step S1304).

As a result, the speech recognition unit 106 performs speech recognition in the first language on the initial utterance included in the first speech signal, and generates text in the first language corresponding to the initial utterance that has been subjected to speech recognition in the first language. The translation unit 107 translates the text in the first language corresponding to the initial utterance that has been subjected to speech recognition in the first language, into the second language. The speech synthesis unit 108 generates a synthesized speech signal that includes synthesized speech in the second language corresponding to the content of the text in the second language generated by the aforementioned translation, and outputs the synthesized speech signal to the reproduction unit 109. The loudspeaker corresponding to the reproduction unit 109 outputs the synthesized speech in the second language on the basis of the synthesized speech signal. Furthermore, the pre-translation text in the first language and the text in the second language obtained by translating the text in the first language into the second language are displayed by the display unit 110 (step S1305).

Thereafter, the translation device 200 carries out the processing of steps S1310 to S1380, similar to embodiment 1.

In this way, the translation device 200 in the present embodiment, when a conversation start operation has been received, acquires a first speech signal corresponding to a speech signal including a first utterance constituting the initial utterance from after the operation has been received, and generates the first speaker model 111a, which is a model of a feature value for an utterance of the first speaker, from the first utterance included in the acquired speech signal, on the basis of the speaking order information. The translation device 200 then translates the acquired first utterance from the first language into the second language on the basis of the language setting information and the speaking order information. When a second speech signal corresponding to a speech signal including a second utterance is acquired thereafter, the translation device 200, similar to embodiment 1, compares a feature value for the second utterance and the first speaker model 111a, thereby recognizes the speaker of the second utterance, and performs a translation in accordance with the recognition result.

Thus, if the languages and the speaking order of the first speaker and the second speaker are set before the start of a conversation, after the start of the conversation, for each utterance, the speaker of the utterance is recognized and translation from the language of the speaker into the language of the counterpart speaker is performed automatically. Consequently, a conversation that involves translation can be carried out smoothly without requiring time and labor such as with a conventional translation method or translation device. That is, a conversation can be carried out smoothly with there being fewer required operations since it is not necessary to carry out an operation for switching the translation language every time the first speaker and the second speaker speak. As a result, an improvement in usability can be achieved.

Furthermore, the translation device 200 in the present embodiment may have the configurations of modified examples 1 to 6 similar to embodiment 1. Thus, the effects of each of the aforementioned modified examples can be demonstrated also in the present embodiment.

Other Embodiments

Hereinabove, a translation device according to one or more aspects has been described on the basis of embodiments and modified examples; however, the present disclosure is not restricted to these embodiments. Modes in which various modifications conceived by a person skilled in the art have been implemented in the aforementioned embodiments and modified examples, and modes constructed by combining constituent elements in different embodiments or modified examples may also be included in the scope of the present disclosure provided they do not depart from the gist of the present disclosure.

For example, in the aforementioned embodiments and modified examples, the translation device is configured having a shape such as a card and is carried by the user; however, the translation device may be configured in a shape such as a tablet. In this case, for example, the translation device may be installed on a counter or the like that has been set up at the reception of a hotel, a commercial facility, or the like.

Furthermore, in the aforementioned embodiments and modified examples, the translation device generates a synthesized speech signal with respect to translated text; however, at such time, the translation device may generate a synthesized speech signal that corresponds to the gender of the speaker. For example, in a case where a first speaker who is male has spoken in the first language, the translation device generates and outputs a synthesized speech signal that includes synthesized speech of a male in the second language. In this case, the language setting unit 102 may set not only the languages of each of the first speaker and the second speaker but may also set the genders thereof. The speech synthesis unit 108 generates a synthesized speech signal including synthesized speech that corresponds to a gender that has been set. Alternatively, the speaker recognition unit 104 may determine the gender of a speaker of an utterance from a feature value for the utterance. In this case, for example, a model of a common male utterance and a model of a common female utterance are stored in the model storage unit 111. The speaker recognition unit 104 then compares a feature value for an utterance and the models, and thereby determines whether the speaker of the utterance is male or female. The speech synthesis unit 108 generates a synthesized speech signal including synthesized speech in the determined gender.

It is thereby possible for synthesized speech that is output from the translation device to be close to speech that is in line with the gender of a speaker, and it is possible for a conversation that involves translation to be carried out smoothly.

Furthermore, the translation device may generate a synthesized speech signal including synthesized speech that is similar to the speech of the speaker, when generating a synthesized speech signal including synthesized speech with respect to translated text. That is, the speech synthesis unit 108 selects a model that corresponds to the speaker who has been recognized with respect to an utterance, from the first speaker model 111a or the second speaker model 111b, and uses the model to generate a synthesized speech signal including synthesized speech. It is thereby possible for synthesized speech that is similar to the speech of the speaker to be output from the translation device in a language that is different from the language of the utterance of the speaker, and it is possible for a conversation that involves translation to be carried out more smoothly.

Furthermore, in the aforementioned embodiments and modified examples, the languages of the first speaker and the second speaker are set in accordance with a user operation; however, the language of an utterance included in a speech signal acquired by the sound pickup unit 101 may be determined on the basis of that utterance. For example, the language determination unit 105 compares a common feature value for the first language and a common feature value for the second language with a feature value for an utterance acquired by the sound pickup unit 101, and thereby determines the language of the utterance. Thus, time and labor for setting languages can be eliminated, and a further improvement in usability can be achieved.

Furthermore, in the aforementioned embodiment 1 and the modified examples thereof, the translation device generates and saves the first speaker model 111a in the model storage unit 111 before the start of a conversation. However, in a case where a plurality of models are stored in advance in the model storage unit 111, the translation device may select one model from the plurality of models as the first speaker model 111a before the start of a conversation. In this case, it is possible to eliminate the generation of models, and it is possible to reduce the processing load of the translation device.

In the aforementioned embodiments and modified examples, the constituent elements may be configured by using dedicated hardware, or may be realized by executing a software program suitable for the constituent elements. The constituent elements may be realized by a program execution unit such as a CPU or a processor reading out and executing a software program recorded on a computer-readable non-transitory recording medium such as a hard disk or a semiconductor memory. Here, a software program for realizing the translation device or the like of the aforementioned embodiments and modified examples causes a computer to execute the steps included in the flowcharts of FIGS. 5, 6A to 6C, 8A, 8B, 10A to 11B, 13A to 13C, 15A to 15C, 17, 20A, or 20B.

It should be noted that each functional block in the block diagrams (FIGS. 4, 7, 9, 12, 14, 16, 18, and the like) is typically realized as an LSI, which is an integrated circuit. These may be implemented separately as single chips or may be implemented as a single chip in such a way as to include some or all of the functional blocks. For example, functional blocks other than memories may be integrated into a single chip.

LSIs have been mentioned here; however, functional blocks may also be referred to as ICs, system LSIs, super LSIs, or ultra LSIs depending on differences in the degree of integration.

Furthermore, the circuit integration technique is not limited to an LSI, and a functional block may be realized using a dedicated circuit or a general-purpose processor. After an LSI has been manufactured, an FPGA (field-programmable gate array) that can be programmed, or a reconfigurable processor with which the connections and settings of circuit cells inside the LSI can be reconfigured, may be used.

In addition, if circuit integration technology that replaces LSI appears as a result of another technology that is an advancement in semiconductor technology or is derived therefrom, naturally, the other technology may be used to carry out the integration of functional blocks. Adaptations of biotechnology or the like are also a possibility.

The present disclosure enables a conversation that involves translation to be carried out smoothly, and, for example, can be used as a translation device that is carried by a person or as a translation device that is installed on a counter or the like.

What is claimed is:

1. An information processing method including:
setting, in a memory, language setting information that includes first language information having associated therein a first speaker and a first language spoken by the first speaker, and second language information having associated therein a second speaker and a second language that is a language spoken by the second speaker and is different from the first language;
acquiring a first speech signal that includes a first utterance of the first speaker, using a microphone;
generating a first speaker model that is a model of a feature value for an utterance of the first speaker, from the first utterance included in the first speech signal;
receiving an operation for starting a conversation;
acquiring a second speech signal that includes a second utterance, using the microphone, after the operation has been received;
recognizing whether or not a speaker of the second utterance is the first speaker, by comparing a feature value for the second utterance included in the second speech signal and the first speaker model;
in a case where it has been recognized that the speaker of the second utterance is the first speaker, based on the language setting information, performing speech recognition in the first language on the second utterance included in the second speech signal, generating text in the first language corresponding to the second utterance that has been subjected to speech recognition in the first language, and translating the text in the first language corresponding to the second utterance into the second language; and,
in a case where it has been recognized that the speaker of the second utterance is not the first speaker, based on the language setting information, performing speech recognition in the second language on the second utterance included in the second speech signal, generating text in the second language corresponding to the second utterance that has been subjected to speech recognition in the second language, and translating the text in the second language corresponding to the second utterance into the first language.

2. The information processing method according to claim 1, wherein, in addition,
speaking order information that indicates the first speaker as a speaker who is to initially speak in a conversation between the first speaker and the second speaker is set in the memory,
in the acquiring of the first speech signal,
a speech signal that includes an initial utterance from after the operation has been received is acquired as the first speech signal, and,
in the acquiring of the second speech signal,
the second speech signal is acquired after the first speaker model has been generated.

3. The information processing method according to claim 1, wherein, in addition,
in a case where the text in the first language corresponding to the second utterance is translated from the first language into the second language,
the first speaker model is updated using the feature value for the second utterance.

4. The information processing method according to claim 1, wherein, in addition,
in a case where the text in the first language corresponding to the second utterance is translated into the second language,
information indicating whether or not a language used for the translation is incorrect is received from a user,
whether or not the language used for the translation is incorrect is determined based on the received information, and,
when it has been determined that the language used for the translation is correct, the first speaker model is updated using the feature value for the second utterance.

5. The information processing method according to claim 4, wherein, in addition,
when it has been determined that the language used for the translation is incorrect,
speech recognition is performed in the second language on the second utterance included in the second speech signal, text in the second language corresponding to the second utterance that has been subjected to speech recognition in the second language is generated, and the text in the second language corresponding to the second utterance is translated into the first language, and
a second speaker model that is a model of a feature value for an utterance of the second speaker is generated from the second utterance.

6. The information processing method according to claim 1, wherein,
in the acquiring of the first speech signal,
it is determined whether or not a time length of an utterance included in an acquired speech signal is greater than or equal to a threshold value, and a speech signal that includes an utterance having a time length that is determined as being greater than or equal to the threshold value is acquired as the first speech signal, and,
in the acquiring of the second speech signal,
it is determined whether or not a time length of an utterance included in a speech signal acquired after the operation has been received is greater than or equal to a threshold value, and a speech signal that includes an utterance having a time length that is determined as being greater than or equal to the threshold value is acquired as the second speech signal.

7. The information processing method according to claim 1, wherein,
in the acquiring of the first speech signal, in addition,
a sound signal that includes a sound picked up using the microphone is acquired before the receiving of the operation for starting the conversation,
it is determined whether or not the sound signal acquired before the receiving of the operation is an utterance, and,
in a case where it has been determined that the sound signal acquired before the receiving of the operation is an utterance, the sound signal acquired before the receiving of the operation is acquired as the first speech signal, and,
in the acquiring of the second speech signal, in addition,
a sound signal that includes a sound picked up using the microphone is acquired after the receiving of the operation for starting the conversation,
it is determined whether or not the sound signal acquired after the receiving of the operation is an utterance, and, in a case where it has been determined that the sound signal acquired after the receiving of the operation is an utterance, the sound signal acquired after the receiving of the operation is acquired as the second speech signal.

8. The information processing method according to claim 1, wherein, in addition, in a case where it has been recognized that the speaker of the second utterance is not the first speaker, a second speaker model that is a model of a feature value for an utterance of the second speaker is generated from the acquired second utterance, a third speech signal that includes a third utterance is acquired using the microphone after the second speaker model has been generated, whether a speaker of the third utterance is the first speaker or the second speaker is recognized by comparing a feature value for the third utterance included in the third speech signal and each of the first speaker model and the second speaker model, in a case where it has been recognized that the speaker of the third utterance is the first speaker, based on the language setting information, speech recognition is performed in the first language on the third utterance included in the third speech signal, text in the first language corresponding to the third utterance that has been subjected to speech recognition in the first language is generated, and the text in the first language corresponding to the third utterance is translated into the second language, and, in a case where it has been recognized that the speaker of the third utterance is the second speaker, based on the language setting information, speech recognition is performed in the second language on the third utterance included in the third speech signal, text in the second language corresponding to the third utterance that has been subjected to speech recognition in the second language is generated, and the text in the second language corresponding to the third utterance is translated into the first language.

9. The information processing method according to claim 8, wherein, in addition, in a case where it has been recognized that the speaker of the third utterance is not the first speaker or the second speaker by comparing the feature value for the third utterance and each of the first speaker model and the second speaker model, the third utterance is rejected.

10. The information processing method according to claim 1, wherein the first speech signal is acquired before the receiving of the operation for starting the conversation.

11. The information processing method according to claim 1, wherein, in addition, in a case where it has been recognized that the speaker of the second utterance is the first speaker, speech in the second language obtained by translating the text in the first language into the second language is output using a loudspeaker, and, in a case where it has been recognized that the speaker of the second utterance is not the first speaker, speech in the first language obtained by translating the text in the second language into the first language is output using the loudspeaker.

12. The information processing method according to claim 1, wherein, in addition, in a case where it has been recognized that the speaker of the second utterance is the first speaker, text in the first language and text in the second language obtained by translating the text in the first language into the second language are displayed using a display, and, in a case where it has been recognized that the speaker of the second utterance is not the first speaker, text in the second language and text in the first language obtained by translating the text in the second language into the first language are displayed using the display.

13. An information processing device, comprising a processor and a memory, the processor setting, in a memory, language setting information that includes first language information having associated therein a first speaker and a first language spoken by the first speaker, and second language information having associated therein a second speaker and a second language that is a language spoken by the second speaker and is different from the first language, generating a first speaker model that is a model of a feature value for an utterance of the first speaker, from a first utterance of the first speaker included in a first speech signal acquired by the microphone, recognizing whether or not a speaker of a second utterance included in a second speech signal acquired by the microphone is the first speaker, by comparing a feature value for the second utterance and the first speaker model, after an operation for starting a conversation has been received, in a case where it has been recognized that the speaker of the second utterance is the first speaker, based on the language setting information, performing speech recognition in the first language on the second utterance included in the second speech signal, generating text in the first language corresponding to the second utterance that has been subjected to speech recognition in the first language, and translating the text in the first language corresponding to the second utterance into the second language, and, in a case where it has been recognized that the speaker of the second utterance is not the first speaker, based on the language setting information, performing speech recognition in the second language on the second utterance included in the second speech signal, generating text in the second language corresponding to the second utterance that has been subjected to speech recognition in the second language, and translating the text in the second language corresponding to the second utterance into the first language.

14. A non-transitory recording medium having a program recorded thereon, the program causing a processor to execute processing including:

setting, in a memory, language setting information that includes first language information having associated therein a first speaker and a first language spoken by the first speaker, and second language information having associated therein a second speaker and a second language that is a language spoken by the second speaker and is different from the first language;

generating a first speaker model that is a model of a feature value for an utterance of the first speaker, from a first utterance of the first speaker included in a first speech signal acquired by the microphone;

recognizing whether or not a speaker of a second utterance included in a second speech signal acquired by the microphone is the first speaker, by comparing a feature value for the second utterance and the first speaker model, after an operation for starting a conversation has been received;

in a case where it has been recognized that the speaker of the second utterance is the first speaker, based on the language setting information, performing speech recognition in the first language on the second utterance included in the second speech signal, generating text in the first language corresponding to the second utterance that has been subjected to speech recognition in the first language, and translating the text in the first language corresponding to the second utterance into the second language; and, in a case where it has been recognized that the speaker of the second utterance is not the first speaker, based on the language setting information, performing speech recognition in the second language on the second utterance included in the second speech signal, generating text in the second language corresponding to the second utterance that has been subjected to speech recognition in the second language, and translating the text in the second language corresponding to the second utterance into the first language.

* * * * *